United States Patent
Bradley

(10) Patent No.: US 7,961,086 B2
(45) Date of Patent: Jun. 14, 2011

(54) SYSTEM AND METHOD FOR VEHICULAR COMMUNICATIONS

(76) Inventor: James Roy Bradley, Carp (CA)

( * ) Notice: Subject to any disclaimer, the term of this patent is extended or adjusted under 35 U.S.C. 154(b) by 350 days.

(21) Appl. No.: 11/736,464

(22) Filed: Apr. 17, 2007

(65) Prior Publication Data

US 2007/0242337 A1    Oct. 18, 2007

Related U.S. Application Data

(60) Provisional application No. 60/792,525, filed on Apr. 17, 2006.

(51) Int. Cl.
*B60Q 1/26* (2006.01)
*G02B 26/00* (2006.01)
*H04B 10/00* (2006.01)

(52) U.S. Cl. .......................... 340/468; 359/238; 398/130
(58) Field of Classification Search .................... 340/468
See application file for complete search history.

(56) References Cited

U.S. PATENT DOCUMENTS

| | | | |
|---|---|---|---|
| 3,601,792 A | 8/1971 | Murray | |
| 3,604,805 A | 9/1971 | Scott | |
| 3,697,941 A | 10/1972 | Christ | |
| 3,790,780 A | 2/1974 | Helmcke et al. | |
| 3,941,201 A | 3/1976 | Hermann et al. | |
| 4,329,729 A * | 5/1982 | Knight | 361/91.5 |
| 4,670,845 A | 6/1987 | Etoh | |
| 4,996,719 A * | 2/1991 | Okazaki et al. | 398/128 |
| 5,295,551 A | 3/1994 | Sukonick | |
| 5,568,136 A | 10/1996 | Hochstein et al. | |
| 5,635,920 A | 6/1997 | Pogue et al. | |
| 5,677,667 A * | 10/1997 | Lesesky et al. | 340/431 |
| 5,708,415 A | 1/1998 | Van Lente et al. | |
| 5,736,935 A | 4/1998 | Lambropoulos | |
| 5,914,652 A | 6/1999 | Adamo | |
| 5,986,575 A | 11/1999 | Jones et al. | |
| 6,243,026 B1 | 6/2001 | Jones et al. | |
| 6,338,651 B1 * | 1/2002 | Svette et al. | 439/559 |
| 6,369,720 B1 | 4/2002 | Wilhelm | |
| 6,400,482 B1 * | 6/2002 | Lupton et al. | 398/140 |
| 6,417,707 B1 * | 7/2002 | Underhill et al. | 327/165 |
| 6,654,681 B1 * | 11/2003 | Kiendl et al. | 701/117 |
| 6,678,321 B1 * | 1/2004 | Graham et al. | 375/238 |
| 6,720,920 B2 * | 4/2004 | Breed et al. | 342/386 |
| 6,765,495 B1 * | 7/2004 | Dunning et al. | 340/903 |
| 6,850,170 B2 | 2/2005 | Neff | |
| 6,885,282 B2 | 4/2005 | Desai et al. | |
| 6,943,677 B2 | 9/2005 | Boyer et al. | |
| 2004/0234268 A1 * | 11/2004 | Olch | 398/118 |
| 2005/0105919 A1 * | 5/2005 | Sugihara et al. | 398/202 |
| 2005/0137782 A1 * | 6/2005 | Shinada | 701/117 |

(Continued)

*Primary Examiner* — Davetta W Goins
*Assistant Examiner* — John F Mortell
(74) *Attorney, Agent, or Firm* — Thomas L. Adams

(57) ABSTRACT

A method for communicating with a vehicle has a generator for producing a data stream that can indicate, street sign information, house number, lead vehicle information, traffic information, oncoming vehicle information, juxtaposed vehicle information, a voice channel, etc. vehicle information can indicate braking, low beam requests, direct or indirect traffic flow information, adjacency, partial adjacency, or presence of nearby vehicles, etc. This signal is generated by at least one of: the sign, house number, oncoming vehicle, lead vehicle, operator of the lead vehicle, operator of the oncoming vehicle, operator of the juxtaposed vehicle, a traffic control system. A device for generating such data streams is discussed, as well as, a device for receiving such data streams. Information pertinent to the people in the vehicles or operation of the vehicle can be modulated on the link.

21 Claims, 24 Drawing Sheets

U.S. PATENT DOCUMENTS

| | | | |
|---|---|---|---|
| 2005/0202853 A1* | 9/2005 | Schmitt et al. | 455/569.2 |
| 2005/0269481 A1* | 12/2005 | David et al. | 250/208.1 |
| 2006/0181034 A1* | 8/2006 | Wilde et al. | 280/5.515 |
| 2006/0273926 A1* | 12/2006 | Schwartz | 340/907 |
| 2007/0078948 A1* | 4/2007 | Julia et al. | 709/217 |

* cited by examiner

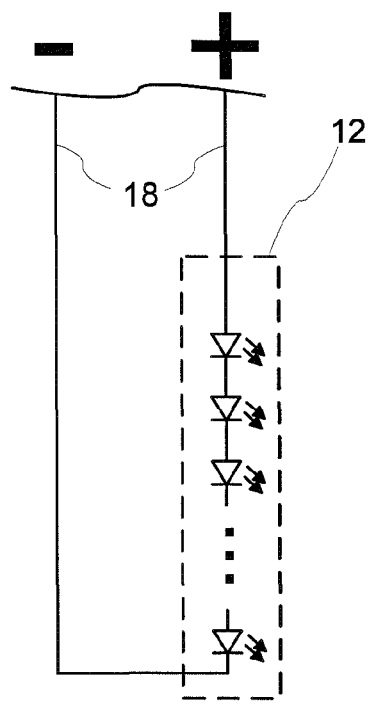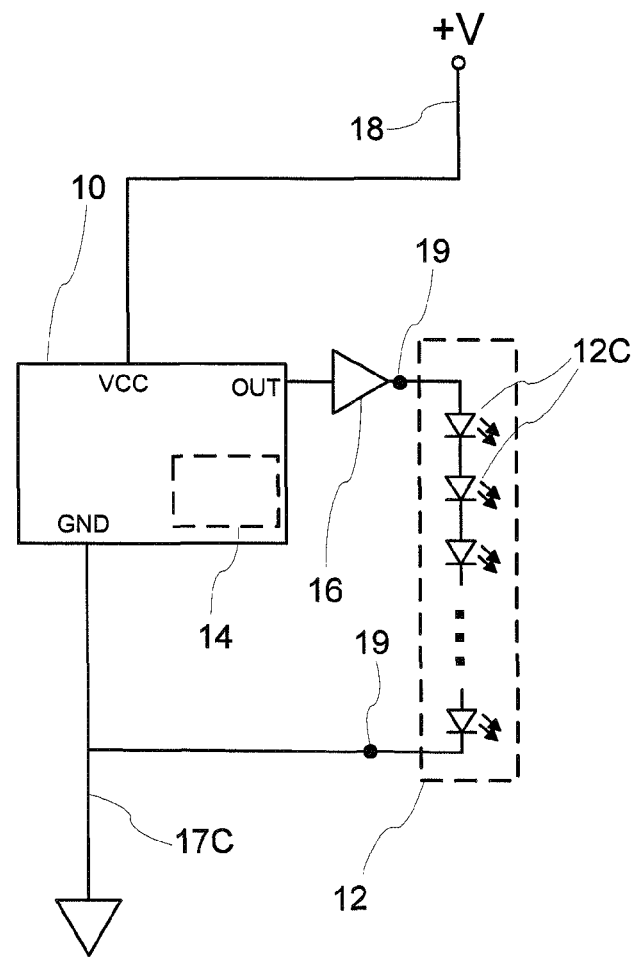
PRIOR ART
FIGURE 1
FIGURE 2

SYSTEM AND METHOD FOR VEHICULAR COMMUNICATIONS

CROSS-REFERENCES TO RELATED APPLICATIONS

This application claims the benefit of U.S. Provisional Patent Application Ser. No. 60/792,525, filed 17 Apr. 2006, the contents of which are hereby incorporated by reference herein.

BACKGROUND OF THE INVENTION

1. Field of the Invention

The present invention relates to communications systems, and in particular, to systems communicating to or from vehicles using modulated electromagnetic radiation in the visible, infrared or other nearby spectra.

2. Description of Related Art

Driving a motor vehicle involves sending and receiving messages and signals of various types. Stoplights, flashing warning lights, detour signs and the like give the driver immediate driving information and instructions. Brake lights and turn signals are illuminated to alert nearby drivers of actions that are being taken or are about to be taken by a driver.

Brake lights and turn signals on many motor vehicles are implemented as LED arrays. Referring to FIG. 1 a schematic representation of an LED array 12 and power supply 18 are illustrated. LED array 12 is connected to the positive potential +V of supply 18 and ground. LED array 12 is an array of serially connected LEDs connected anode to cathode. The positive potential of supply 18 connects to the anode of the first LED of array 12 while the last one has its cathode connected to ground. The LEDs 12 are arranged to provide a voltage drop across the entire LED array 12 equal to the system voltage of the application in which the LED array 12 is installed. In typical vehicle applications the system voltage is commonly 6, 12, 24, or 50 volts. When the proper voltage is applied to the LED array 12, it will illuminate. LED arrays such as this are used in automotive applications typically for marker, brake, and turn signal lamps.

The information that can be conveyed by these traffic signals and vehicle signals is relatively limited. On the one hand, the media is limited to the visual. Also, the information content is relatively small and the sender does not have the opportunity to send more complicated messages.

In some cases a driver may want to receive more complex information. For example, if a detour is necessary the driver may want to know more about the appropriate detour route. If traffic congestion lies ahead, a driver would like to know about such difficulties in advance and receive sufficient information to plot a course avoiding such congestion. The driver may use a radio to get traffic reports, but these are often not comprehensive and current, are not available continuously, and may report only the most serious congestion.

Drivers can receive information from various wireless devices such as cell phones, wirelessly connected PDAs, CB radios, walkie-talkies, etc. These devices are not however well adapted to provide information about the driver's immediate surroundings. Also, such devices may require a driver to operate a keyboard or control panel, which may not be feasible or safe while driving.

See also, U.S. Pat. Nos. 3,601,792; 3,604,805; 3,790,780; 3,941,201; 4,670,845; 5,295,551; 5,568,136; 5,635,920; 5,708,415; 5,736,935; 5,914,652; 5,986,575; 6,243,026; 6,369,720; 6,654,681; 6,850,170; 6,885,282; and 6,943,677.

SUMMARY OF THE INVENTION

In accordance with the illustrative embodiments demonstrating features and advantages of the present invention, there is provided a communications arrangement for transmitting a message from a vehicle. The vehicle has an operator controllable assembly operable by a vehicle occupant for selectively energizing a plurality of electrical connectors that connect to operator controllable vehicle lights including one or more of turn signals, brake lights, headlights, and parking lights. The arrangement includes a processor that has a modulator and is coupled to the operator controllable assembly. The modulator is adapted to be connected to one or more of the plurality of connectors to affect the one or more of turn signals, brake lights, headlights, and parking lights. The modulator has an input adapted to receive an occupant-initiated control signal and produce in response an encoded main signal selectively modulated at or above a critical flashing frequency or with a pulse duration that is human imperceptible. Also included is a receiver and a utilization device. The receiver has a light sensing device for producing a detection signal. The utilization device is coupled to the receiver for using the detection signal.

In accordance with another aspect of the invention, there is provided a communications arrangement for transmitting a message from a vehicle. The vehicle has an externally powered, but otherwise, stand-alone enhanced lighting assembly including a processor having a modulator. The modulator is adapted to energize one or more of: head lights, fog-lights, position lights, mirror lights, parking lights, tail lights, turn signals, and brake lights. The modulator has an input adapted to receive a processor-initiated sequence and produce in response an encoded main signal modulated at or above a critical flashing frequency or with an inter-pulse blanking interval that is human imperceptible In accordance with yet another aspect of the invention, there is provided a system for exchanging messages among a plurality of vehicles. Each of the vehicles has one or more externally detectable signalers. The system has in each vehicle a transceiver with a processor. The processor has a vehicle sensitive apparatus for producing a dynamic signal signifying traveling information associated with dynamic operation of the vehicle. The processor has a modulator coupled to the vehicle sensitive apparatus. The processor is adapted to be coupled to the one or more signalers for sending thereto in response to the dynamic signal a main signal modulated and encoded to indicate at least some of the traveling information. The transceiver includes a receiver mounted in the vehicle that has a luminance sensing device for producing a detection signal in response to receipt of the main signal sent from the one or more externally detectable signalers of other ones of the vehicles. The transceiver has a utilization device mounted in the vehicle and coupled to the receiver for using the detection signal In accordance with still yet another aspect of the invention, there is provided a method for exchanging messages among a plurality of vehicles. Each of the vehicles has a transceiver, a luminance sensing device, and one or more externally detectable signalers. The method includes the step of producing a dynamic signal signifying traveling information associated with dynamic operation of a given one of the vehicles. Another step is sending to the one or more signalers in response to the dynamic signal a main signal modulated and encoded to indicate at least some of the traveling information.

The method also includes the step of producing a detection signal from the luminance sensing device in response to receipt thereof of the main signal sent from the one or more externally detectable signalers of other ones of the vehicles. Another step is using the detection signal In accordance with a further aspect of the invention, there is provided a method of transmitting an optically encoded message from a vehicle having one or more signalers with one or more stand-alone externally detectable lights. The method includes the step of producing and sending to the at least one signaler an encoded modulation signifying at least one of: an indication of vehicle identification, and lamp assembly serial number. The externally detectable lights include at least one of: headlamp, fog-lamp, position lamp, mirror lights, parking lights, tail light, turn light, and brake light. The modulation is responsive to a processor-initiated sequence in order to produce an encoded main signal modulated at or above a critical flashing frequency or with an inter-pulse blanking interval that is human imperceptible In accordance with yet another aspect of the invention, there is provided a communications arrangement for transmitting a message from a vehicle. The vehicle has an operator controllable assembly operable by a vehicle occupant for selectively energizing a plurality of electrical connectors that connect to operator controllable vehicle lights including one or more of turn signals, brake lights, headlights, and parking lights. The arrangement has a processor with a modulator and is coupled to the operator controllable assembly. The modulator is adapted to be connected to one or more of the plurality of connectors to affect the one or more of turn signals, brake lights, headlights, and parking lights. The modulator has an input adapted to receive an occupant-initiated control signal and produce in response an encoded main signal selectively modulated at or above a critical flashing frequency or with an inter-pulse blanking that is human imperceptible.

In accordance with another aspect of the invention, there is provided a communications arrangement for transmitting a message from a vehicle having one or more externally detectable signalers. The arrangement has a processor with a vehicle sensitive apparatus for producing a dynamic signal signifying traveling information associated with dynamic operation of the vehicle. The processor includes a modulator coupled to the vehicle sensitive apparatus and adapted to be coupled to the one or more signalers for sending thereto in response to the dynamic signal a main signal modulated and encoded to indicate at least some of the traveling information. This modulation is conducted at or above a critical flashing frequency or with an inter-pulse blanking that is human imperceptible.

In accordance with yet another aspect of the invention, there is provided a communications method for transmitting a message from a vehicle having one or more externally detectable signalers. The method includes the step of producing a dynamic signal signifying traveling information associated with dynamic operation of the vehicle. Another step is sending to the one or more signalers in response to the dynamic signal a main signal modulated and encoded to indicate at least some of the traveling information. This modulation is conducted at or above a critical flashing frequency or with an inter-pulse blanking that is human imperceptible.

In accordance with a further aspect of the invention, there is provided a system for transmitting a message to a vehicle. The system has a traffic signaling device for providing a dynamic traffic information signal relevant to driving the vehicle. The signaling device has a modulator for producing a main signal modulated and encoded according to the dynamic traffic information signal. This modulation is conducted at or above a critical flashing frequency or with a pulse duration that is human imperceptible. Also included is a receiver mounted in the vehicle for receiving the dynamic traffic information signal. The receiver has a luminance sensing device for producing a detection signal. The system also has a utilization device mounted in the vehicle and coupled to the receiver for using the detection signal.

In accordance with yet another further aspect of the invention, a method is provided employing a traffic signaling device for transmitting a message to a vehicle. The method includes the step of providing a dynamic traffic information signal relevant to driving the vehicle. Another step is producing a main signal modulated and encoded according to the dynamic traffic information signal. This modulation is conducted at or above a critical flashing frequency or with a pulse duration that is human imperceptible. The method also includes the step of receiving in the vehicle the dynamic traffic information signal and producing therefrom a detection signal. Another step is using the detection signal in the vehicle.

In accordance with still yet another further aspect of the invention, there is provided a system for transmitting a message to a vehicle. The system has a signaling device for providing a travel information signal relevant to driving the vehicle. The signaling device has a modulator for producing a main signal modulated and encoded according to the travel information signal. This modulation is conducted at or above a critical flashing frequency or with a pulse duration that is human imperceptible. Also included is a receiver mounted in the vehicle for receiving the travel information signal. The receiver has a luminance sensing device for producing a detection signal. The system also has a utilization device mounted in the vehicle and coupled to the receiver for using the detection signal.

In accordance with another aspect of the invention, there is provided a system for exchanging messages among a plurality of vehicles. Each of the vehicles has one or more externally detectable signalers. The system has in each vehicle a transceiver including a processor, a receiver, and a utilization device. The processor has a vehicle sensitive apparatus for producing a dynamic signal signifying traveling information associated with dynamic operation of the vehicle. The processor includes a modulator coupled to the vehicle sensitive apparatus and adapted to be coupled to the one or more signalers for sending thereto in response to the dynamic signal a main signal modulated and encoded to indicate at least some of the traveling information. The transceiver also includes a receiver mounted in the vehicle and having a luminance sensing device for producing a detection signal in response to receipt of the main signal sent from the one or more externally detectable signalers of other ones of the vehicles. The transceiver also includes a utilization device mounted in the vehicle and coupled to the receiver for using the detection signal.

In accordance with another aspect of the invention, a method is provided for exchanging messages among a plurality of vehicles. Each of the vehicles has a transceiver, a luminance sensing device, and one or more externally detectable signalers. The method includes the step of producing a dynamic signal signifying traveling information associated with dynamic operation of a given one of the vehicles. Another step is sending to the one or more signalers in response to the dynamic signal a main signal modulated and encoded to indicate at least some of the traveling information. The method also includes the step of producing a detection signal from the luminance sensing device in response to receipt thereof of the main signal sent from the one or more externally detectable signalers of other ones of the vehicles. Another step is using the detection signal.

By employing equipment and methods of the foregoing type improved vehicle communications is achieved. In one embodiment a microcontroller is programmed to produce a modulated main signal when powered. This processor can be used to drive an LED array, for example. In such a case, the LED array provides a predetermined modulated light signal signifying a message such as "stop" or "left turn", for a processor associated with a stoplight or left turn signal, respectively. The processor can be built into a replaceable vehicle light or can be contained on a separate printed circuit board located at some distance from the vehicle light. Also, the presently disclosed equipment can be used to modulate light from headlamps, tail lamps, fog lamps, running lights, etc. Also, these vehicle lights can emit light in the visible, ultraviolet or infrared range.

To avoid objectionable flickering, the modulation repetition rate (normally a pulse repetition rate) will be kept higher than 15 Hz, a rate that is referred to herein as a critical flashing frequency. In some cases the repetition rate may be less than the critical flashing frequency but the pulse duration will be kept small enough so as to not be human perceptible. For the purposes of this disclosure a pulse duration of less than 30 ms will be considered human imperceptible. On the other hand, in most embodiments, superior performance is achieved if the pulse repetition rate is kept higher than 150 Hz or the pulse duration is kept less than 3 ms.

In some embodiments modulation is dictated by a separate data source that is either dedicated to one or more specific lights or is a central source for controlling the modulation of all lights that might be modulated. For cases where more complex messages are desired, the data source can be a PDA or an operator's panel having certain buttons or a keypad for selecting specific messages that are to be encoded in the modulated signal. In some of these cases the data source can be tied into a central electronic control system similar to that found on conventional vehicles. In still other cases the modulation may be produced by a microphone to implement a walkie-talkie feature.

Embodiments are anticipated where the data source can communicate its selection signal by modulating the current on a power line using either an electromagnetic coupler, a current shunt (ohmic coupler), capacitive coupling, switching into the power line (electronic or relay) or the like. In some cases the processor can modulate a power line with troubleshooting or status information. For example a defective vehicle light can produce a failure signal. Alternatively, a functioning light can produce a regular status or heart beat signal that verifies proper operation of the vehicle light. These data signals can be captured by a portable diagnostic device, for example, a device that plugs into a power utility socket (cigarette lighter socket). The portable diagnostic tool may capture these signals in order to drive a simple display indicating the location and nature of a fault.

In some embodiments the vehicle will have a receiver that may be as simple as a directional light sensor that is sensitive to the spectrum of expected transmitters. The sensor can be designed to capture modulated emissions from other vehicles, traffic signals, roadside signalers, house-mounted devices for indicating house number, etc. The transmitted information can be simple vehicle information (braking, turning left, etc.). Traffic signalers and roadside signs can also include information about the status of the traffic signal or can include more complicated information such as detour information, public service announcements, etc. The received information can be decoded and presented as synthesized speech, a simple visual or audible alarm, or a character display.

In still other embodiments the sensor may be an image sensing device such as a CCD, video camera, or the like. In such a case, the receiving system can concentrate its attention to certain visual elements in the field of view. For example, the system can notice that modulation of a characteristic type is occurring in certain regions of the field of view. Frame to frame changes covering a significant region can be detected and recorded over time to determine the coding of a modulated signal. In some embodiments objects matching certain templates can be targeted for special attention as likely sources of modulated signals. In some cases the changes are averaged over a predetermined nXm pixel matrix to reduce the effect of spurious noise or the effect produced by an edge moving across a field of view.

In another embodiment a family of vehicles may have transceivers for exchanging traffic information. For example a vehicle may have a GPS that is used for recording the travel history of a vehicle, which may reveal traffic congestion. This information can be exchanged between vehicles and relayed to still other vehicles to develop a shared database of traffic information. This traffic information can be used to display regions of congestion and allow a driver to map alternate routes.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein:

FIG. 1 is a schematic diagram of an LED array that is part of the prior art;

FIG. 2 is a schematic block diagram of apparatus in accordance with principles of the present invention;

DETAILED DESCRIPTION OF THE PREFERRED EMBODIMENTS

Figure 3:
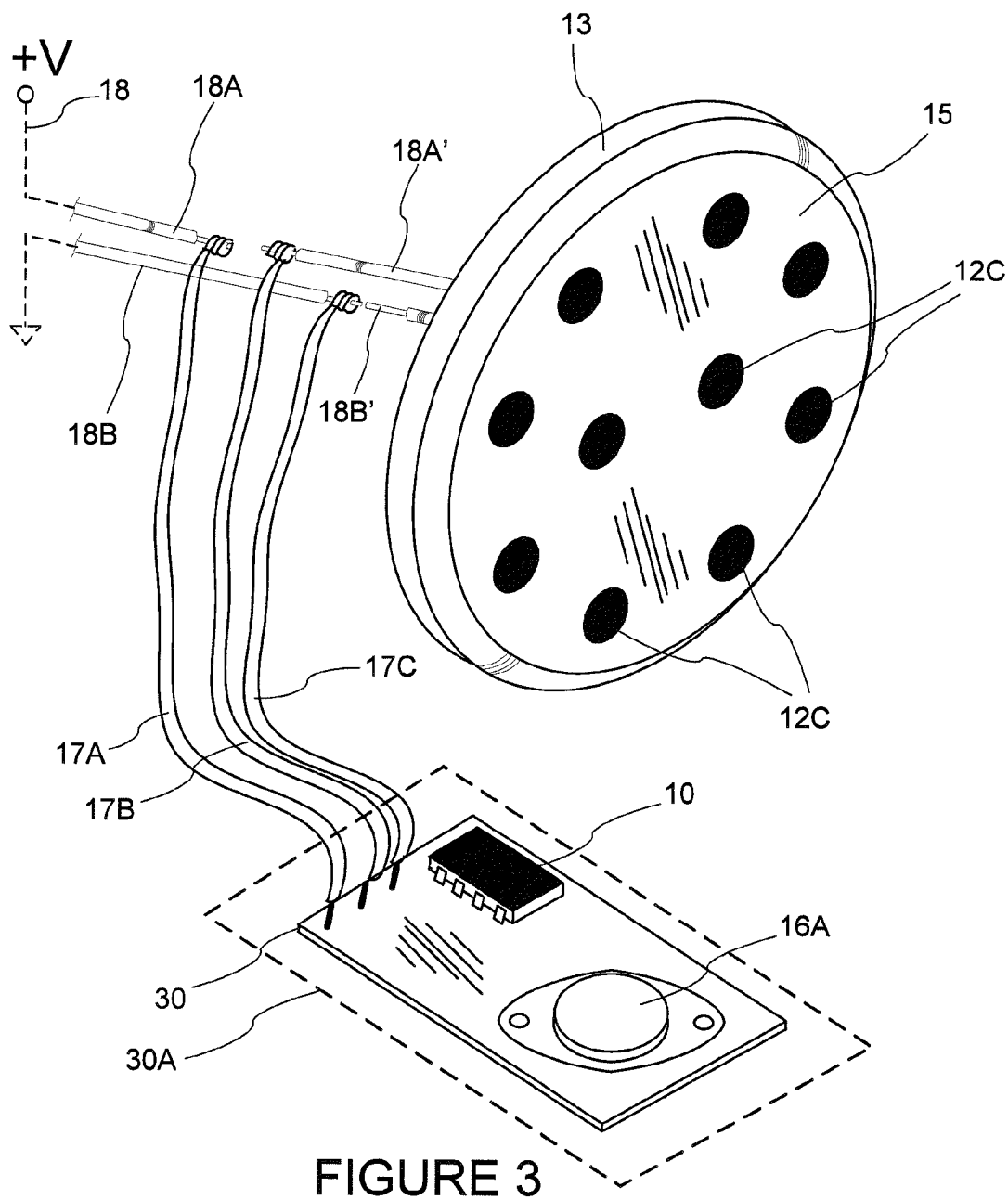
FIG. 3 is a perspective view of an LED assembly showing installation in a vehicle.

Referring to FIG. 2, previously mentioned LED array 12 is shown connected with electrical connectors 19 and employing LEDs 12C connected in series (cathode to anode), but may also be arranged in parallel or series/parallel configurations. Terminal VCC of processor 10 is connected to potential +V of supply 18 and terminal GND of processor 10 is connected to ground. Processor 10 is a microcontroller having memory 14. Processor 10 includes a modulator which is implemented in software to be described presently, although other embodiments may employ a separate discrete modulator. Terminal OUT of processor 10 is connected to the input of amplifier 16 whose output is connected to the anode end of LED array 12 whose opposite cathode end is connected to ground.

Referring to FIG. 3, the previously mentioned LED array 12 is shown assembled into a disc-shaped fixture 13. Previously mentioned LEDs 12C are shown set into openings of fixture 13, to be visible through a non-opaque plastic cover 15 attached to fixture 13. Fixture 13 has on its rear side a number of pins (not shown) designed to fit into a socket (also not shown).

Figure 4:
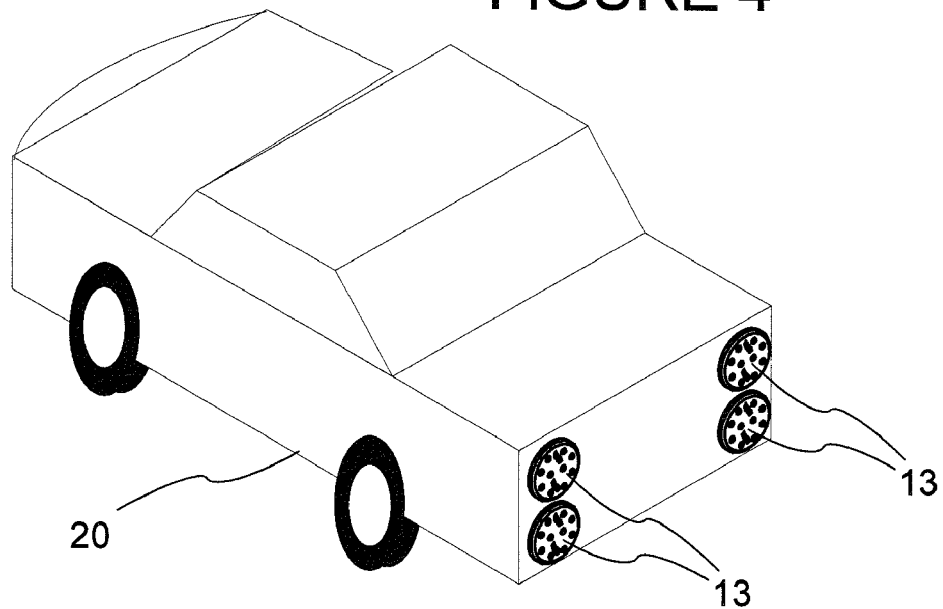
FIG. 4 is perspective view of a vehicle fitted with LED assemblies as shown in FIG. 3.

As shown in FIG. 4, fixture 13 is designed to be used as a taillight/brake light in vehicle 20. While vehicle 20 a shown as an automobile, other vehicle types are contemplated, including trucks, vans, minivans, SUVs, motorcycles, bicycles, trailers, aircraft, watercraft, etc. Fixture 13 is mounted to vehicle 20 by any well known fastening method. Pins (not shown) on fixture 13 will plug into a vehicle socket (not shown).

Referring again to FIG. 3, conventional vehicle wiring 18A and 18B would ordinarily be connected directly to fixture 13 to illuminate LEDs 12C when, for example, the brake pedal is depressed. (The brake pedal, turn signal lever, light switches etc. in the vehicle's passenger compartment for operating various externally observable lights are herein referred to as an operator controllable assembly (or vehicle sensitive apparatus) for providing an operator initiated signal for controlling operator controllable vehicle lights.) Specifically, wire 18B is grounded and wire 18A supplies potential +V when the operator of vehicle 20 depresses the brake pedal (to produce what is herein referred to as a dynamic signal signifying traveling information associated with dynamic operation of the vehicle). This normal wiring is shown modified and connected to printed circuit board 30 (PCB 30) by means of wires 17A, 17B, and 17C whose proximal ends are soldered into holes on board 30.

Board 30 is installed by splicing into the wires 18A and 18B which ordinarily connect to LED array 12. In this Figure, wire 18A was cut leaving fragment 18A' running to fixture 13. The insulation is stripped from the cut ends of wires 18A and 18A' to facilitate a wire wrap connection to the distal ends of PCB leads 17A and 17B, respectively. Also, the insulation is removed from a portion of wire 18B to expose its conductor 18B' to allow a wire wrap connection to the distal end of PCB lead 17C. Alternatively, these connections may be made using other methods such as soldering or the use of crimp connectors. In addition, a combination of connection methods may be used as well.

Previously mentioned processor 10 is shown on PCB 30 as an integrated circuit microcomputer, and previously mentioned signal amplifier 16 is shown as a power transistor 16A. Other components exist on PCB 30 but are not shown for simplification purposes. PCB 30 may be mounted in an enclosure 30A with an opening to allow routing of PCB leads 17A, 17B, and 17C in order to facilitate installation. Such an enclosure would provide protection for PCB 30 in a vehicle. This enclosure 30A may be mounted to vehicle 20 at the fenders, quarter panels, passenger compartment, trunk or any other suitable location that will contain and protect the enclosure from the elements and road debris.

Wire 18A coming from potential +V of power supply 18 is connected through PCB lead 17A to a trace (not shown) on PCB 30 to processor 10; specifically to terminal VCC previously shown in FIG. 2. Wire 18A' coming from LED array 12 is connected to the distal end of PCB lead 17B using solder, wire wrap, or any other method of making an electrical connection. The proximal end of wire 17B is similarly connected to PCB 30, and then electrically connected by a trace (not shown) to the output of amplifier 16, as was shown in FIG. 2. Wire 18B is connected through PCB lead 17C to a ground bus (not shown) on PCB 30 and thus to terminal GND of processor 10 as was shown in FIG. 2.

The above wiring modifications accomplish the connection shown in FIG. 2; that is, +V and ground are connected to processor 10 and the output of amplifier 16 connected to array 12. These connections divert the current in wire 18A that ordinarily flowed directly to LED array 12 so this current now flows to PCB 30 in order to intensity modulate LED array 12 as described below.

The operation of the device shown in FIGS. 2-4 is described as follows: When the brake pedal (not shown) of vehicle 20 is undepressed, power supply 18 does not apply potential +V to PCB 30 so LED array 12 remains off. When the vehicle operator depresses the brake pedal, potential +V of power supply 18 is provided to PCB through lead 17A to terminal VCC of processor 10 (which may therefore be considered a modulator input for receiving an occupant-initiated control signal). Processor 10 is thereby powered and a predetermined pulse train is output as an encoded main signal from terminal OUT of processor 10 to amplifier 16 in a manner to be described presently. Signal amplifier 16 brings the pulse train to an appropriate power level to drive LEDs 12C of LED array 12.

Figure 5:
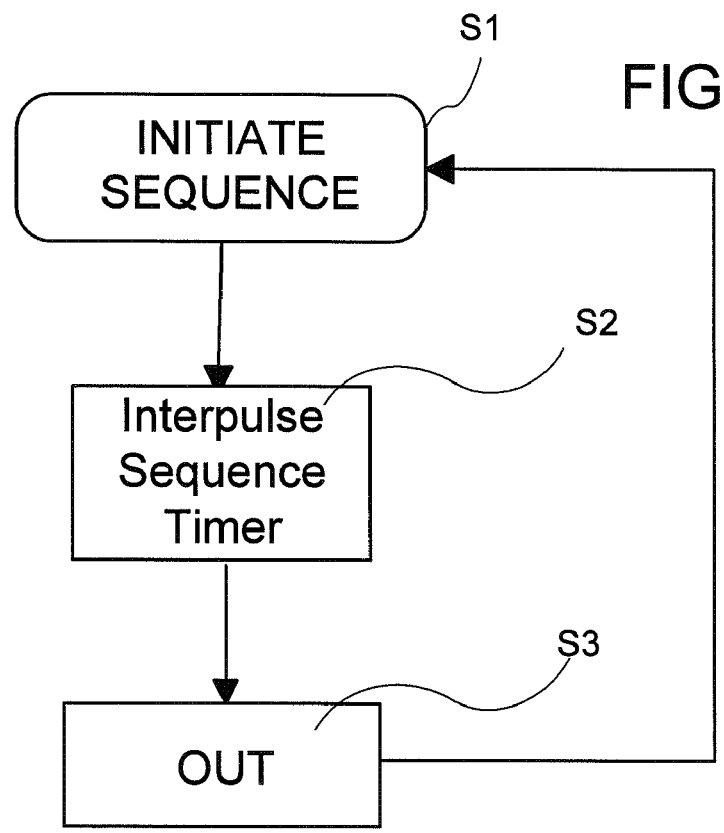
FIG. 5 is a flow chart associated with the processor of FIG. 2.

Referring to FIG. 5, the illustrated flowchart depicts the program running in processor 10 of FIG. 2 for generating a pulse train. Once powered by brake pedal depression, step S1 is immediately executed by processor 10 where it is initialized and prepares to execute the program stored in memory (memory 14 of FIG. 2). In step S2, processor 10 uses programmed timers to produce a pulse train having a pattern based on a data sequence stored in memory. In step S3, the pulse train is output with the appropriate timing sequence via terminal OUT (FIG. 2) of processor 10 to signal amplifier 16.

Processor 10 now loops from step S3 to step S1 and the process is repeated indefinitely until power is removed from terminal VCC of processor 10.

With the foregoing, full illumination of LED array 12 can represent a digital 1, while a digital 0 can be represented by the off state (dark) or a dimmed state. The pulse train may be generated using any one of a variety of communications protocols such as ISO OSI, EIA RS-232, and TCP/IP. Various other types of modulation techniques may be used as well, including PPM, PCM, etc.

The nominal repetition rate of the pulse train is sufficiently high so that LED array 12 appears continuously on even though LEDs 12C are actually modulated by the pulse train. In addition, the duty cycle of the pulse train may be selected to prevent noticeable dimming. This can be accomplished either by adjusting the duty cycle of the pulse train itself or by providing pulse bursts separated by sufficiently long intervals so that the overall duty cycle remains high. To prevent objectionable flickering the modulation will be kept at or above a critical flashing frequency. In some embodiments the pulse repetition rate of the modulation will be higher than 15 Hz or for superior performance, 150 Hz or more. Alternatively, the modulation can be conducted with a pulse duration that is human imperceptible, e.g., less than 30 ms; or for superior performance 3 ms or less.

In any event the pulse repetition rate will be kept high enough to distinguish it from the flashing normally associated with turn signals, caution signals, and the like. Specifically, the pulse repetition rate will be kept higher than 15 Hz, a rate that is referred to herein as a critical flashing frequency. In some cases the pulse repetition rate may be less than the critical flashing frequency but the pulse duration will be kept small enough so as to not be human perceptible. For the purposes of this disclosure a pulse duration of less than 30 ms will be considered human imperceptible. On the other hand, in most embodiments, superior performance is achieved if the pulse repetition rate is kept higher than 150 Hz or the pulse duration is kept less than 3 ms.

In this embodiment the pulse train output from terminal OUT of processor 10 is encoded with the message STOP. This message is appropriate for this LED array, which functions as a brake light. Other messages appropriate for LED arrays with various other intended uses will be described presently.

In the embodiment just described, processor 10 is dedicated to producing a single encoded message appropriate for the intended function of modulated LED array 12. For autonomous embodiments where the encoded message is determined locally without influence from some remote controller, such autonomous embodiments are referred to as "stand alone" embodiments.

Figure 6:
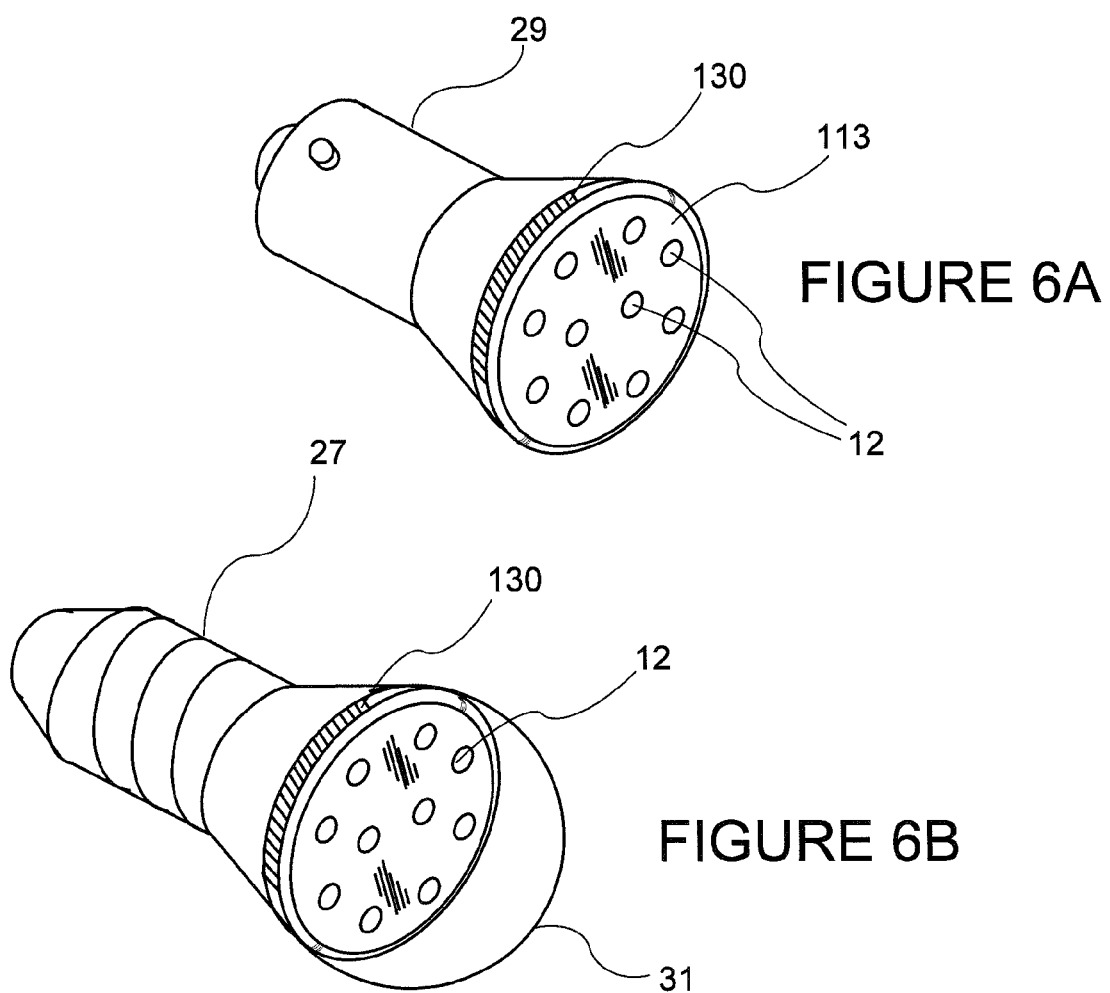
FIGS. 6A and 6B are perspective views of stand-alone signalers incorporating the apparatus of FIG. 2.

Referring to FIGS. 6A and 6B, two stand alone arrangements are shown as one-piece bulbs used in place of a conventional bulb. This arrangement eliminates the need to modify the existing vehicle wiring.

FIG. 6A shows a replacement bulb having a housing base 29 supporting a platform 113 containing previously mentioned LED array 12. Mounted inside housing base 29 is printed circuit board 130, which contains the same circuitry previously shown in connection with PCB 30 of FIG. 3, so that said base, said LED array, and said processor form a readily installable, self-contained assembly. In particular, PCB 130 is connected to receive power from the conventional contacts on housing base 29 and is arranged to modulate light emitters, namely, LED array 12. The bulb in FIG. 6A is designed to replace a conventional bayonet-type bulb.

FIG. 6B shows a bulb similar to the bulb in FIG. 6A except housing base 27 is designed to thread into conventional screw sockets. An optional transparent lens 31 may be used to give the replacement bulb substantially the same physical outline as a conventional incandescent bulb.

The bulbs shown in FIGS. 6A and 6B are driven in the manner just described in connection with PCB 30 and LED array 12 of FIG. 3. The bulbs repetitively output a predetermined message for purposes described herein. The bulbs may be mechanically keyed so as to fit only in their proper location; for example, a brake light bulb will be keyed to fit only in a brake light socket. Alternatively, keying may be provided electronically wherein information is received by a bulb from the socket base in which it is installed. The bulb would then operate in the appropriate manner depending on whether it is placed in a stop light, tail light, or other socket base. The stand alone embodiments described above send a single message repeatedly whenever energized. In some embodiments the bulb may encode the lighting assembly serial number (or a vehicle identification number), which will then be transmitted and used to identify the vehicle as part of larger network of vehicles. In other embodiments to be described presently it is desirable to send different messages at different times Referring to FIG. 7, previously described LED array 12 will again be used as a vehicle brake light. Processor 110 is similar to processor 10 shown in FIG. 2 (and is deemed to include a modulator implemented by software) except processor 110 has terminal IN for receiving signals from an external source such as data source 42 via line 40. Source 42 may be considered as providing modulator input for representing an occupant-initiated control signal. Memory 114 of processor 110 stores a program and numerous pulse train patterns for outputting a variety of messages. In this embodiment, potential +V of power supply 18 is connected to terminal VCC of processor 110 so that it is powered only when the brake pedal (not shown) is depressed.

Figure 7:
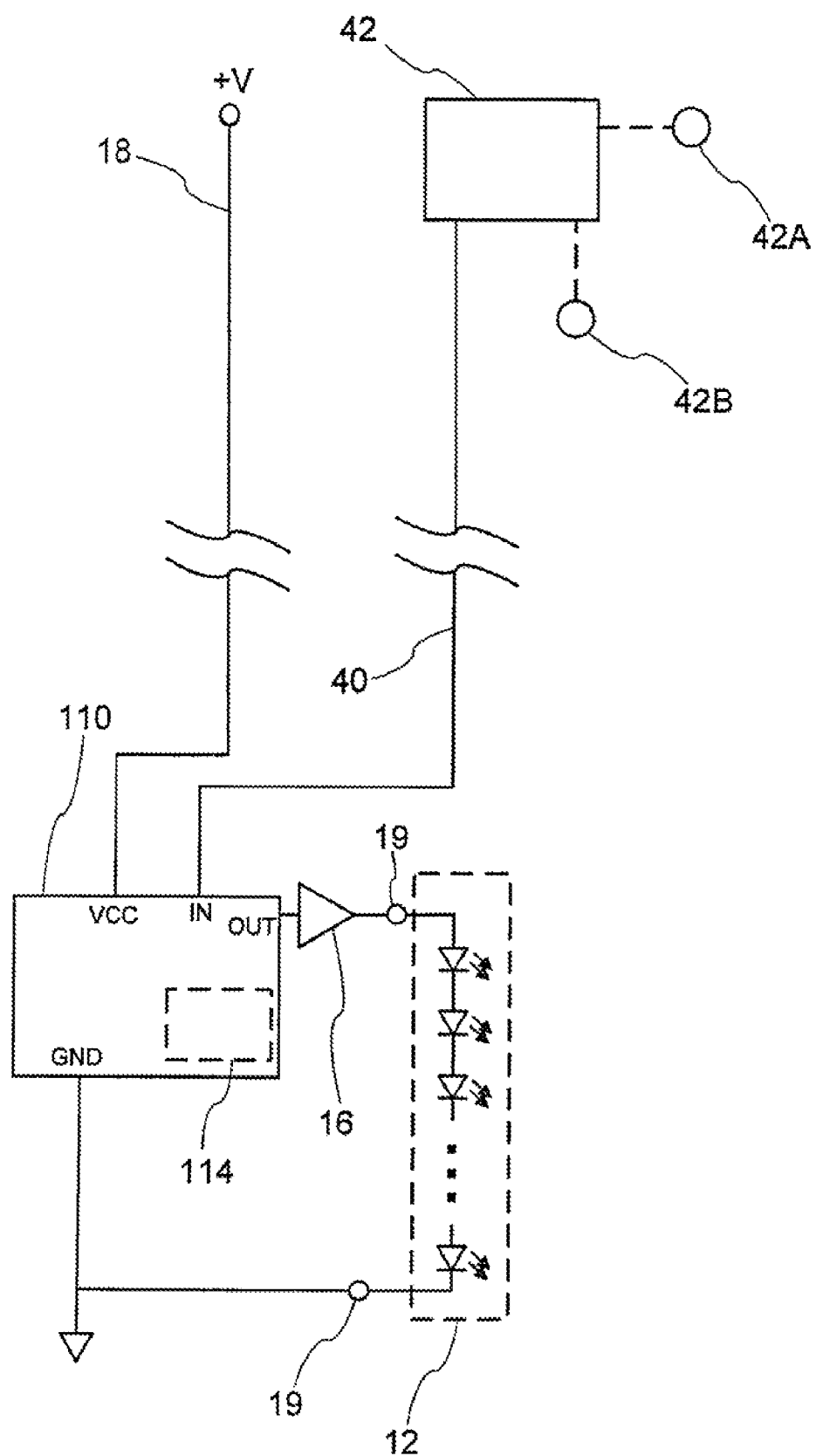
FIG. 7 is a schematic block diagram of apparatus that is an alternate to that of FIG. 2 and including a separate data source.
Figure 8:
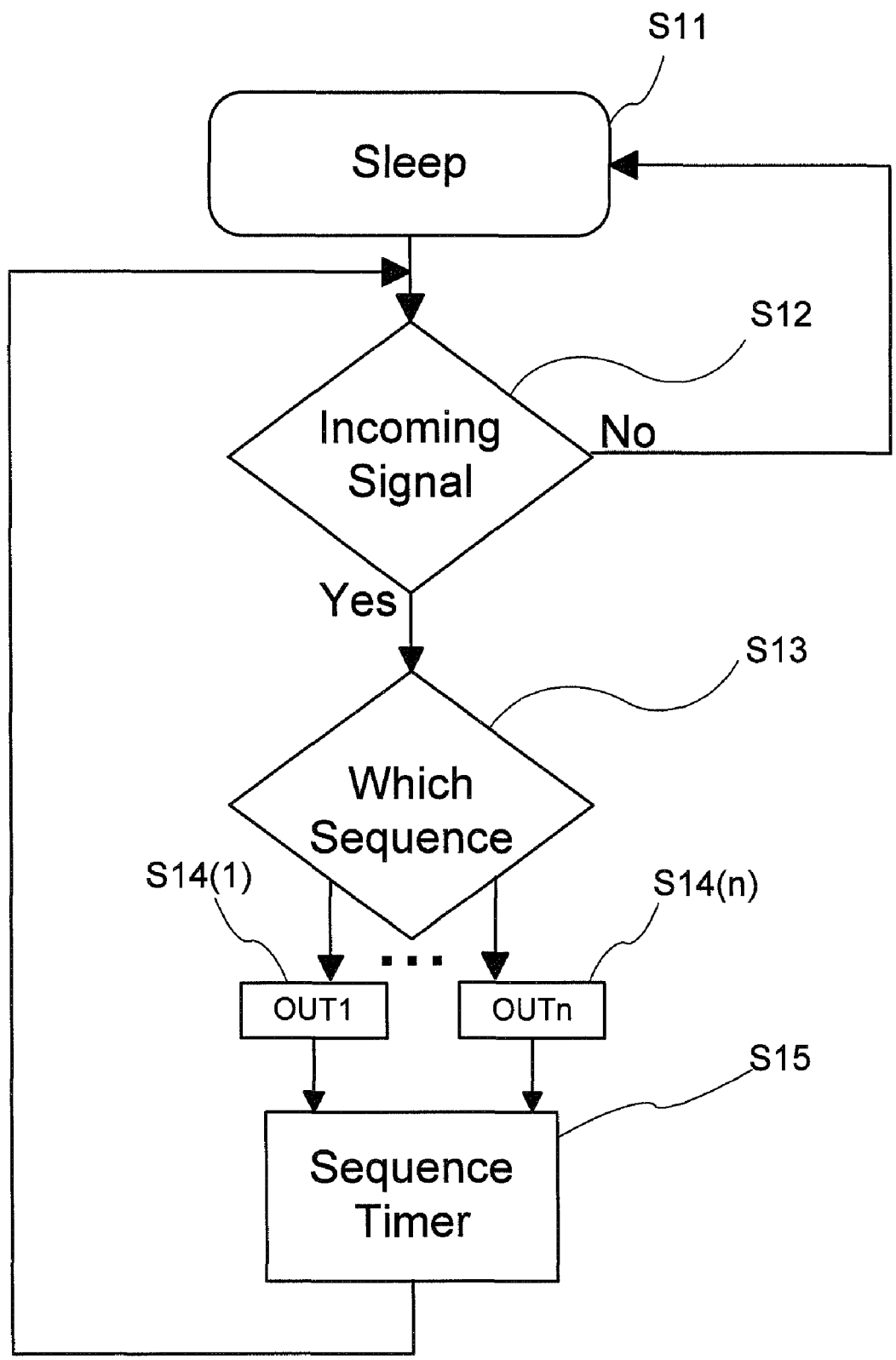
FIG. 8 is a flowchart associated with the processor of FIG. 7.

The flowchart of FIG. 8 illustrates the program contained in memory 114 of processor 110 of FIG. 7. When the brake pedal is depressed, potential +V of power supply 18 is applied to terminal VCC of processor 110 causing it to initialize and enter step S11. Processor 110 then immediately proceeds to step S12 and looks for a selection signal on its terminal IN from data source 42 of FIG. 7. This control signal will signify a response desired from processor 110. If no signal is detected, processor 110 loops back to step S11 and will continue to loop between steps S12 to step S11 until a signal is detected on terminal IN of processor 110. In that event, step S12 will then branch to step S13.

In step S13, the selection signal from data source 42 of FIG. 7 is analyzed to determine which pulse train pattern data the source 42 is requesting. After a specific pulse train pattern is identified, the program proceeds to the associated one of the steps S14(1) through S14(n) to assemble the pulse train pattern being requested. In step S15, the requested pulse train is output as an encoded main signal to drive LED array 12 of FIG. 7.

The program then loops back to step S12 and continues to look for a signal from data source 42. If the same signal is present as before, the program will produce an output just as before. If a different signal is present, the program will produce the newly requested output. If no signal is present, the program will again loop between steps S11 and S12, waiting for a new signal.

The program will continue to loop through the flowchart of FIG. 8 until the brake pedal is no longer depressed at which time potential +V is removed from terminal VCC of processor 110 and no output is possible regardless of any signal being sent by source 42 of FIG. 7.

Data source 42 of FIG. 7 may continuously send a signal correlating to a request for an encoded STOP message. In some embodiments data source 42 is capable of detecting depression of the brake pedal, in which case the STOP signal may be transmitted only when the brake pedal is depressed. Furthermore, when the brake pedal is not depressed data source 42 produces no signal so that the LED array 12 is extinguished.

In the embodiment just described, data source 42 may send token signals such as a byte encoded under some communication protocol. Processor 110 interprets the token signals and correlates them with pulse trains stored in memory 114 in order to assemble the output messages such as STOP, LEFT TURN, RIGHT TURN, etc. These assembled pulse trains when applied to LED array 12 produce light pulses that carry information under a generally accepted code so that a wide class of observers can interpret the message. Accordingly, the token code used by source 42 may in general be different from the code transmitted by LED array 12.

Instead of using a single token code correlating to a multiple letter message, the signals from data source 42 may consist of a sequence of data signifying letters making up a message. In particular, data source 42 may send a signal to processor 110 signifying the start of the transmission followed by a sequence of data signifying letters making up a message. Data source 42 would eventually send a signal to processor 110 signifying the end of the transmission. Processor 110 would then correlate the message received with one of several pulse train patterns stored in memory 114 of processor 110. Alternatively, each letter may be correlated with a pulse subsequence contained in memory 114, which will then be used together with other subsequences to assemble the complete pulse train.

In other embodiments, the signals from data source 42 to processor 110 may consist of the actual pulse train pattern to be transmitted. Data source 42 would send a signal to processor 110 signifying the start of the transmission followed by a sequence of data signifying the actual pulse train to be transmitted. Data source 42 would finally send a signal signifying the end of the transmission.

In some cases because of the programming of processor 110, a brief occurrence of a signal from data source 42 may cause LED array 12 to transmit a message repetitively for a longer, preprogrammed duration or a preprogrammed number of repetitions. In still other cases, the message transmitted by LED array 12 may be repeated a specific number of times based on data encoded in the signal sent from data source 42 to processor 110.

In some cases potential +V of power supply 18 is continuously provided to terminal VCC of processor 110 of FIG. 7. Data source 42 would then signal processor 110 what pulse train to output, when to output it, and for how long. In this case, any of the previously mentioned formats for allowing data source 42 to communicate with processor 110 may be used. It will be noticed that for this latter arrangement, source 42 can be used as a controller to simply turn LED on and off without impressing any modulation.

Data source 42 may employ an operating panel 42A (an operator controllable assembly for producing an occupant-initiated signal (or dynamic signal)) with one or more manual controls such as dedicated pushbuttons each correlated to a predetermined message; a keypad that allows the user to compose a message with one or more characters; or any other device that can transmit an electrical signal. Also, an electronic control unit 42B carried by a vehicle may receive vehicle data from various sensors such as a brake pedal switch, a turn signal switch, and a headlight switch (and therefore may operate as an operator controllable assembly for producing an occupant-initiated signal). The electronic control unit 42B would forward the signals (to produce what is herein referred to as a dynamic signal signifying traveling information associated with dynamic operation of the vehicle) through data source 42 to processor 110, which would then output pulse trains to LED array 12 in response.

It will be appreciated that data source 42 can communicate not just with processor 110 but with multiple processors (not shown). For example, data source 42 could be connected in parallel with four processors: two modulating two LED arrays used as brake lights; and two modulating two LED arrays used as turn signals. In this case, the data sent by source 42 will include an address identifying which processors or to respond to the request to produce a modulated message.

In addition source 42 can operate processor 110 in a conventional unmodulated mode. For example, a driver may wish to simply illuminate a brake light with steady (unmodulated) voltage when, for example, parking lights are turned on. When a brake pedal is later depressed, the brake light is brightened to indicate braking and modulated to send an encoded stop message in a modulated mode.

Figure 9:
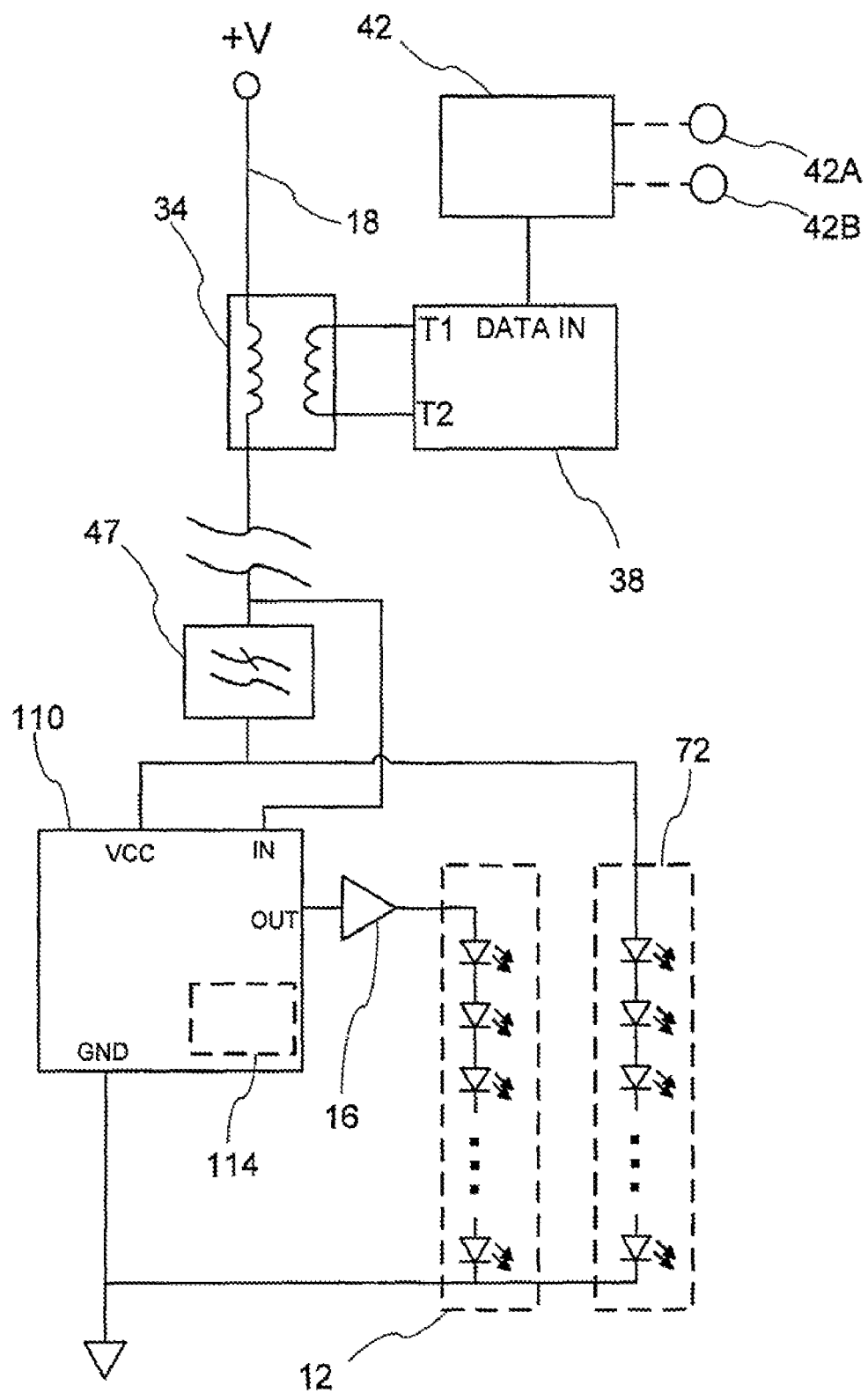
FIG. 9 is a schematic block diagram of apparatus that is an alternate to that previously illustrated.

Referring to FIG. 9, previously mentioned processor 110 and LED array 12 operate as described previously in FIG. 7; however, in this embodiment, the data source 42 transmits signals to processor 110 as a modulated carrier on the power line conducting potential +V of power supply 18. Specifically, data source 42 transmits a signal to terminal DATA IN of driver 38. Output terminals T1 and T2 of driver 38 connect to line coupler 34. Line coupler 34 is inductively coupled to the line carrying potential +V of power supply 18, which in turn connects directly to terminal IN of processor 110 and indirectly through low pass filter 47 to terminal VCC of processor 110.

Coupler 34 employs a coil acting as an electromagnetic coupler that is capable of electromagnetically coupling to a line, much like a transformer primary couples to a secondary.

Terminals T1 and T2 of driver 38 supply coupler 34 with a modulating pulse train having a generally high frequency content. The spectrum is chosen so that the modulation is not easily masked by other frequencies normally appearing on potential +V of power supply 18. In alternative embodiments, the electromagnetic coupler may be replaced with a current shunt (ohmic coupling) and associated hardware. In yet another embodiment, potential +V of power supply 18 may be perturbed by a capacitively connected coupler. In still another embodiment the power line voltage can be modulated by using a switching circuit, either electronic or relay circuit.

The modulation signal thus induced is blocked by filter 47 to eliminate interference on supply terminal VCC of processor 110. On the other hand, this modulation signal is received at terminal IN of processor 110 for further processing in a manner to be described presently.

Optional light emitter 72 illuminates when +V potential is supplied through filter 47 from power supply 18, in this embodiment, when the brake pedal is depressed. Because filter 47 supplies filtered (unmodulated) power to LED array 72, fewer than all LED arrays of a light assembly 12/72 are employed for modulation.

Figure 10:
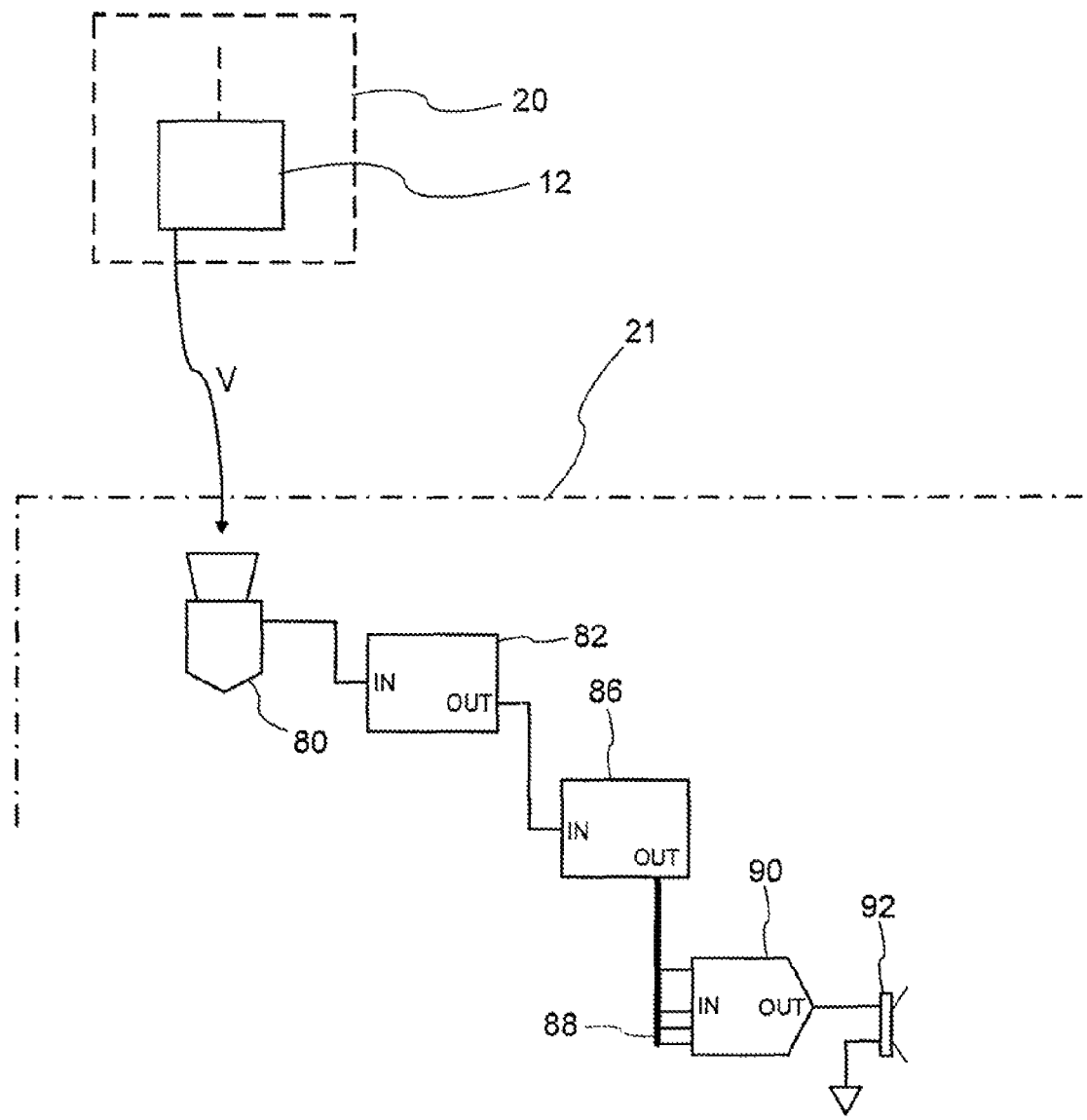
FIG. 10 is a schematic block diagram of apparatus that is part of a system that is an alternate to that previously illustrated.

Referring now to FIG. 10, a receiver has in this embodiment an omni directional or directional photosensor 80 operating as a luminance sensing device that is capable of receiving a signal from LED array 12 and other ambient light sources. In some embodiments the photosensor may employ a parabolic reflector to enhance directionality.

LED array 12 may emit light over a large solid angle, but only in a narrow band of the visible or infrared spectrum. Accordingly, sensor 80 may be sensitive only to this specific spectrum either inherently or because of a built-in filter.

Communication of inter-vehicle messages may be implemented as follows: A transmitting vehicle 20 may have "stand alone" bulbs, as shown in FIG. 6A (or 6B), that are used as brake lights, turn signals, headlamps, tail lamps, fog lamps, running lights, or the like. (It will be appreciated that in some embodiments transmission may be accomplished using the alternate arrangements of FIG. 3, 7, or 9).

As an example, the operator of vehicle 20 may notice an obstacle and immediately depress the brake pedal, causing the car to rapidly decelerate. Depression of the brake pedal also energizes the vehicle's "stand alone" bulb of FIG. 6A thereby applying potential +V of power supply 18 to terminal VCC of processor 10 (FIG. 2). Processor 10 immediately begins outputting a pulse train, encoded with the message STOP, at terminal OUT, which is connected through signal amplifier 16 to drive the LEDs 12C of LED array 12 (LED array 12 shown in both FIGS. 6A and 10).

The sensor 80 of vehicle 21 as shown in FIG. 10 will produce a composite signal responding to all luminance sources in its field of view. Because sensor 80 is particularly sensitive to the spectrum from array 12, its modulated light will be prominent. This signal is sent to terminal IN of processor 82 (referred to as an analyzer that is part of a utilization device). Also, because the modulated light has relatively high frequency components in a narrow band, these can be made more prominent by appropriate bandpass filtering in processor 82.

Processor 82 processes the modulated signal and produces at its terminal OUT a recovered signal indicating the presence and the coding associated with that signal. This signal is sent to terminal IN of processor 86, which operates as an annunciator that translates the encoded signal into a digitized synthesized speech pattern output on terminal OUT. The output of processor 86 is converted in digital to analog converter 90 before being applied to speaker 92. Specifically, speaker 92 broadcasts the synthesized speech, in this case, the word "stop". The operator of the receiving vehicle 21 might not have immediately noticed the lighting of brake lights 12 in the transmitting vehicle 20, but will more likely respond to the audible "STOP" announcement.

In order for the communications system to work, both the transmitter and the receiver must work with signals using an agreed communications protocol, although in some cases the receiver can be designed to recognize any one of several protocols that may be used by a transmitter.

Various messages of the foregoing type may be sent using the modulated light communication links described above. Simple codes carried in the modulated light signals may represent various messages. For example, one simplified code (e.g., a byte) can signify STOP, another LEFT TURN, still another RIGHT TURN, etc. These simplified codes can direct the receiving unit to synthesize one of several speech messages. In some embodiments these messages may be presented instead as distinctive tones the driver eventually learns to associate with different messages. Alternatively, processor 82 can produce a signal to activate a warning light, buzzer, bell, character display (e.g., liquid crystal display) or other annunciator. In still other embodiments a warning light or a character display (e.g. liquid crystal display) may be used to as an annunciator.

In another embodiment processor 82 may connect over a parallel data bus directly to DAC 90. In still other embodiments, the output of processor 82 may connect to an amplifier driving speaker 92 or be connected directly to speaker 92, in which case processor 82 produces a pulse train with a duty cycle that varies in accordance with the desired audio waveform.

The foregoing described an arrangement for broadcasting a dedicated message with the processor 10 of FIG. 2. In other embodiments the transmitting vehicle 20 may employ processor 110 of FIG. 7, in which case varying messages may be specified by data source 42 (FIG. 7). As noted previously, data source 42 may include an operating panel 42A that is mounted in the passenger compartment. Panel 42A may have several manual controls pre-programmed to initiate certain messages: For example, STOP TAILGATING, CONGESTION AHEAD, DRIVE CAREFULLY, CALL FOR EMERGENCY ASSISTANCE, CHANGING LANES, etc. These buttons and messages may be programmed at the factory or programmed by the user after purchase. Also, information may be transmitted in one language or code but may on receipt be recoded or annunciated, or displayed in another language, which is user selectable or otherwise.

In some cases, source 42 may have a keypad so that the driver may stop and type a message that is then broadcast repeatedly even after the driver resumes traveling. A laptop computer or PDA (personal digital assistant) may also be used as part of the data source 42 to generate messages that are converted into a format that is usable by processor 110 of FIG. 7.

While the foregoing system transmitted modulated visible light using LEDs, other systems may employ IRLEDs, incandescent lamps, electrical discharge lamps, strobe lights or other types of signalers that will be modulated to transmit encoded messages. Also, intensity modulation of a vehicle's headlights may be used to transmit encoded messages for capture and interpretation by a receiving device in an opposing vehicle. In some cases the headlights may be incandescent and will not therefore sustain rapid modulation. Nevertheless, modulation is possible but will be done at a slower data rate with redundancy to increase the accuracy of transmission. Different modulation techniques may be used depending on the light source to be modulated thereby allowing any light source on a vehicle to be used as a transmitter.

With the foregoing arrangements, modulated light is only transmitted when the vehicle's lights are lit in a traditional manner. For brake lights and turning signals this operation is of course intermittent. When modulated light transmission is desired at any time at the driver's independent discretion, the driver may use daytime running lamps (DRLs). In some cases these DRLs will simply be a matter of turning on and modulating the vehicle's headlights, parking lamps, tail lamps, fog lamps, etc., although dedicated lights of various types can be mounted on the vehicle's body for this sole purpose.

The communications links described above may also send digitized audio messages originating from a microphone or other source. In such a case the processor may transmit modulated light on the taillights of one vehicle which is captured by a receiver in a trailing vehicle. The operator of the trailing vehicle may return the voice transmission by using a similar microphone and processor to produce a pulse train that modulates the intensity of the trailing vehicle's headlights or other light dedicated to or adapted for signal transmission. The leading vehicle can receive this return message using a rearward-facing image sensor, before conversion into an audible signal in the manner previously described. The operators of the leading and trailing vehicles are therefore able to communicate with each other in half duplex, or full-duplex fashion.

In some embodiments the communications links will be used for general purposes such as transferring word processor files, spreadsheet files, JPEG images or any other any other type of file that is susceptible to encoding and transmission as modulated light.

In some embodiments luminance sensing device 80 of FIG. 10 employs a video camera, CCD, CMOS sensor, vidicon tube or similar image-sensing device mounted in a motor vehicle 21 on, for example, a dashboard. Image sensor 80 can be synchronized or semi-synchronized at a known camera frame rate such as 60 Hz for NTSC. Image sensor 80 has a predetermined two dimensional field of view and is operable to produce a detection signal with spatial content for distinguishing a plurality of visual elements in the predetermined two dimensional field of view. Accordingly, image sensor 80 is able to distinguish spatially regionalized visual elements that occupy less than all of the two dimensional field of view of the sensor 80.

In this embodiment image sensor 80 performs a raster scan of a scene and records horizontal lines of pixels to capture successive frames of a scene. Image sensor 80 outputs successive frames to terminal IN of processor 82 (referred to as an analyzer that is part of a utilization device). Processor 82 processes the frames and outputs at terminal OUT a decoded signal indicating the presence and the coding associated with that signal in the manner to be described presently.

Figure 11:
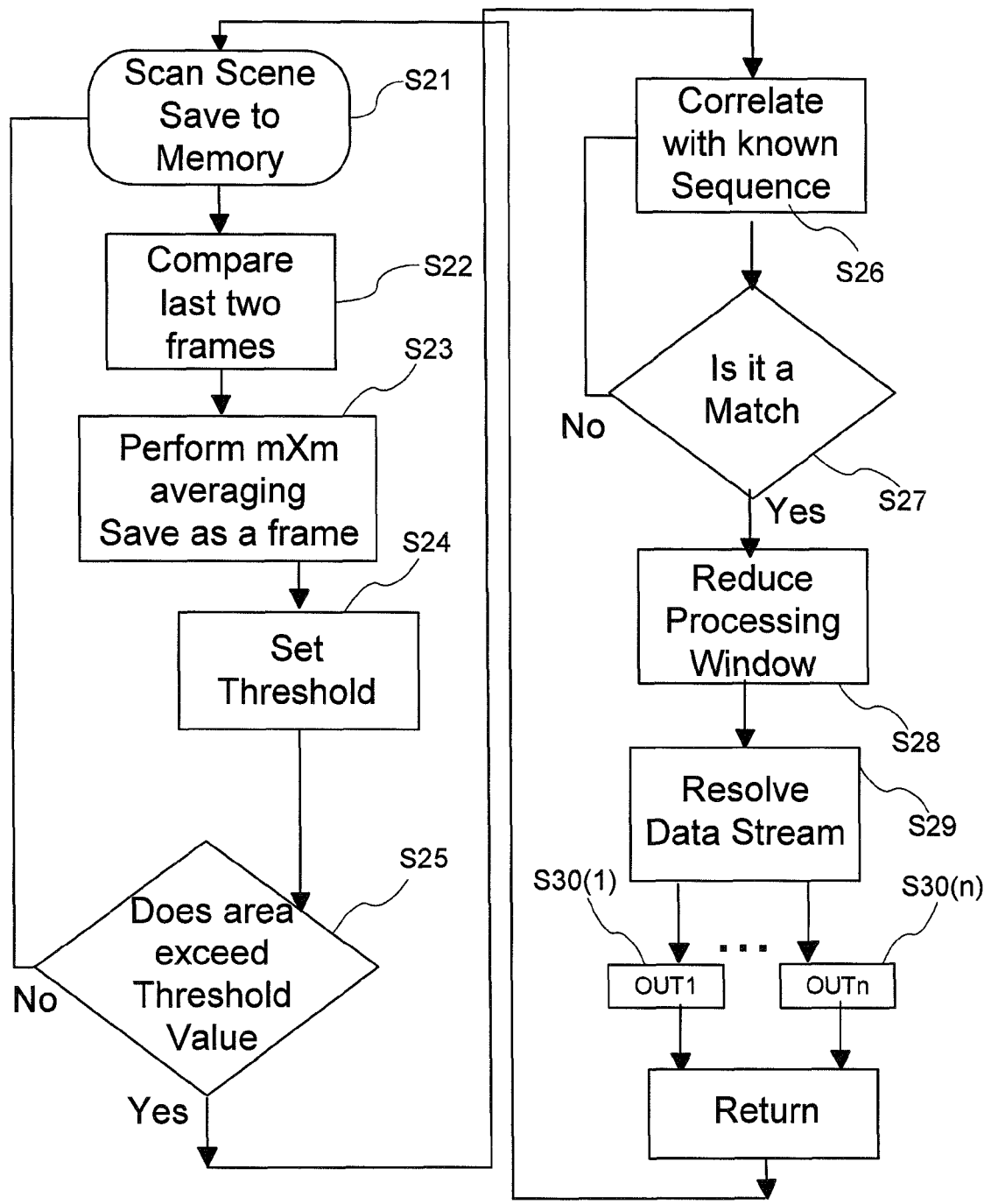
FIG. 11 is a flowchart showing image processing being performed by the system of FIG. 10.

The flowchart of FIG. 11 illustrates a program running on processor 82 for handling two dimensional information from image sensor 80 of FIG. 10. In step S21 frames captured by image sensor 80 are stored in the memory of processor 82. The rate at which the frames are scanned (frame rate) and saved to memory is chosen based upon several factors. One factor is the speed of modulation selected for LED array 12 in vehicle 20 (FIG. 10). The frame rate must be sufficiently high to ensure capture of the modulated signal from LED array 12. A frame rate of twice the highest transmitted modulation frequency will ensure that a pulse cycle does do not occur between captured frames. Another factor is the rate at which objects in the scene appear to move. The image of fast moving objects captured with a slow frame rate may cause processor 82 to use resources to analyze dramatic changes in the image.

In some embodiments the received pulses may have lower repetition rate if the image sensor 80 is synchronized to modulated optical signal, in which case each field or frame will have reliable bit information. This synchronization can occur by including in the transmitted optical signal a code indicating the pulse repetition rate (bit time synchronization information). Then the image sensor 80 can run its frame rate, field rate or line rate just below (or just above) this encoded rate value and then observe any phasing errors that occur. After a few frames, the image sensor can be quickly synchronized to the incoming optically modulated signal.

In any event, in step S22 two successive frames are compared. Assuming, for the present explanation, that nothing in the scene is moving, the only possible change in the scene will be LED array 12 (FIG. 10) switching on or off. The two successive frames are compared pixel by pixel and a third frame is generated which represents the amount of change in intensity of each individual pixel from the earlier frame to the later frame. This third frame, hereinafter referred to as the delta intensity frame, is partitioned into a matrix of mXm spatial elements that is coarser than actual spatial resolution of device 80 in order to perform mXm averaging as follows:

In step S23, mXm averaging is performed on the mXm matrix of spatial elements derived from the delta intensity frame. The coarseness of the matrix is dependent upon the desired resolution of the visual elements captured by image sensor 80, the amount of noise the system is subject to, the expected size of the modulated area in a scanned frame, the need to deal with moving objects in a scene, as well as other factors. The change in intensity of the pixels that make up each element of the mXm matrix (these matrix elements also being referred to as spatially coincidental subframe regions) are averaged to create an averaged intensity value in order to generate a fourth frame (or matrix) containing the average change in intensity of each spatial element of the mXm matrix. Use of mXm averaging helps to reduce noise and edge effects. Alternatively, other methods such as nXm averaging may be used as well.

Edge effects occur when objects are moving in the scene. As an object moves, significant intensity changes occur along the edge of the object from frame to frame. For example, consider two successive frames where an object in the scene moves from right to left a distance equivalent to one pixel. Pixels to the left of the object will change in intensity from object intensity to the background intensity. Moreover, pixels to the right of the object will change in intensity from the background intensity to the object intensity.

If mXm averaging is not used, the change in intensity of one pixel involved in the edge effect becomes as prominent as pixels involved in the relevant modulation. However, dividing the frame into a grid and averaging the change in intensity of groups of mXm pixels reduces the problems associated with edge effect. Edge effects produce dramatic changes along a line of pixels but that effect is reduced by averaging those pixels with the neighboring unchanging pixels. Similarly, the noise manifesting itself as spuriously changing pixel intensity values will be reduced as well. On the other hand, intensity changes across broad areas within a spatial element of the mXm matrix corresponding to an object sending a modulated signal are not averaged down and therefore remain prominent.

Step S24 determines the intensity difference threshold that will be used to determine whether an intensity difference is great enough to be considered a possibly modulated signal. Processor 82 (FIG. 10) analyzes the delta intensity frame over all elements of the mXm matrix and relies on predetermined criteria to make selections based on the median value of these average differences (although other embodiments may rely on the mean or the mode). This median value is used as the threshold below which intensity differences are ignored (alternatively, a different threshold value may be used, such as a value in the range of 50% to 80% of the median value).

For example, suppose that two successive frames of a scene processed using steps S21 through S23 generate an mXm matrix of intensity differences, one for each matrix element. The area of a matrix element that corresponds to a modulated LED array 12 would exhibit a large change in intensity, typically greater than the threshold. All other areas of the scene would have a more modest change in intensity because the intensity measurement in each matrix element in each frame is averaged over the area associated with a matrix element. Although areas subject to edge effects will show some intensity difference, because of the mXm filtering these differences would be averaged down, normally to a level below the threshold.

In particular, in step S25 each element of the mXm delta intensity frame is compared with the threshold value determined previously in step S24. Any element with intensity changes that equal or exceed the threshold are passed to step S26, otherwise the program loops back to step S21.

In Step S26, the changes in intensity of the matrix elements from frame to frame are assembled to eventually form pulse trains representing the transmitted message. Because the sampling frame rate is at least twice the highest transmitted pulse repetition rate, the system is able to reliably capture the pulse train without dropping pulses. The assembled pulse train is then compared pulse by pulse with the sequences stored in memory. When a match is found in step S27 programming branches to step S28, which is executed next. In one embodiment, when a match is found the scan rate of sensor element 80 is immediately synchronized to the perceived sequence. In one embodiment, the modulated signal can include a pulse burst for synchronizing the receiver in order to optimize data capture at a particular baud rate.

In step S28, the program determines whether the mXm matrix elements exceeding the threshold are a spatially coincidental subframe region (typically contiguous elements or elements clustering in a relatively small region) and therefore form a broad area of interest. If one or more broad areas of interest are determined the system will give those areas and their neighborhoods a high priority, making certain that they are always under analysis. Areas that only show transient activity will not be further processed until a sustained activity is established.

In the succeeding step S29, the message received from the object sending the modulated signal (in this case LED array 12) is tagged with a local identifier. Next, the associated one of the steps S30(1) through S30($n$) produces a corresponding one of the outputs OUT(1) through OUT($n$). In step S30(1) through S30($n$), the message is output from terminal OUT of processor 82 in a format appropriate for any one of a variety output devices described herein. The program then loops back to step S21 and the process is repeated.

Steps S21 through S25 can be launched as one or more threads that run continually on processor 82. Steps S26-S27, step S28, and steps S29-S30 may also be run as separate threads on processor 82. Steps S21 through S25 will then continually look for an area that exceeds the threshold value. Whenever an area exceeds the threshold in step S25, the processor 82 will invoke steps S26-S27. If a portion of the captured pulse train matches a known sequence stored in the memory of processor 82, the threads involving steps S28 through S30 are invoked using information obtained in step S27. These threads are active and continually analyze a specific area of the captured image in order to output an appropriate message for as long as the object of interest continues to send an appropriately modulated signal.

In this embodiment each of the outputs OUT1-OUT$n$ of steps S30(1)-S30($n$) assemble a serial data stream corresponding to synthesized speech. In particular, processor 86 (FIG. 10) outputs a data stream in a speech synthesized format through UART 86 to input IN of analog to digital converter 90, which converts the parallel data to an analog signal for driving speaker 92.

Various techniques may be used to reduce the amount of memory required to perform the frame analysis in steps S22 through S25 of FIG. 11. For example, the comparison of a first frame at time $t_1$ to a second frame at time $t_2$ in order to create a derived frame (delta intensity frame) may be performed by overwriting the $t_1$ frame data so that only two frames are stored in memory, not three. The $t_2$ frame would not be immediately overwritten, as it is needed when analyzing a third frame at time $t_3$.

Figure 12A:
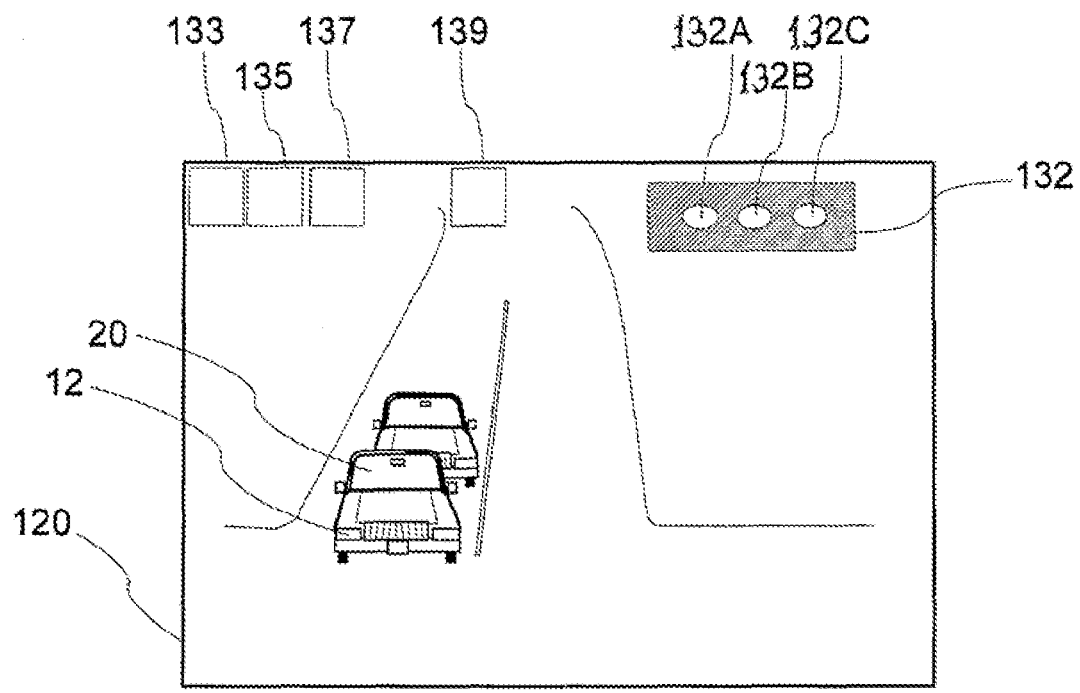
FIG. 12A is an illustration of an image frame captured with the system of FIG. 10 and being subjected to template matching.
Figure 12B:
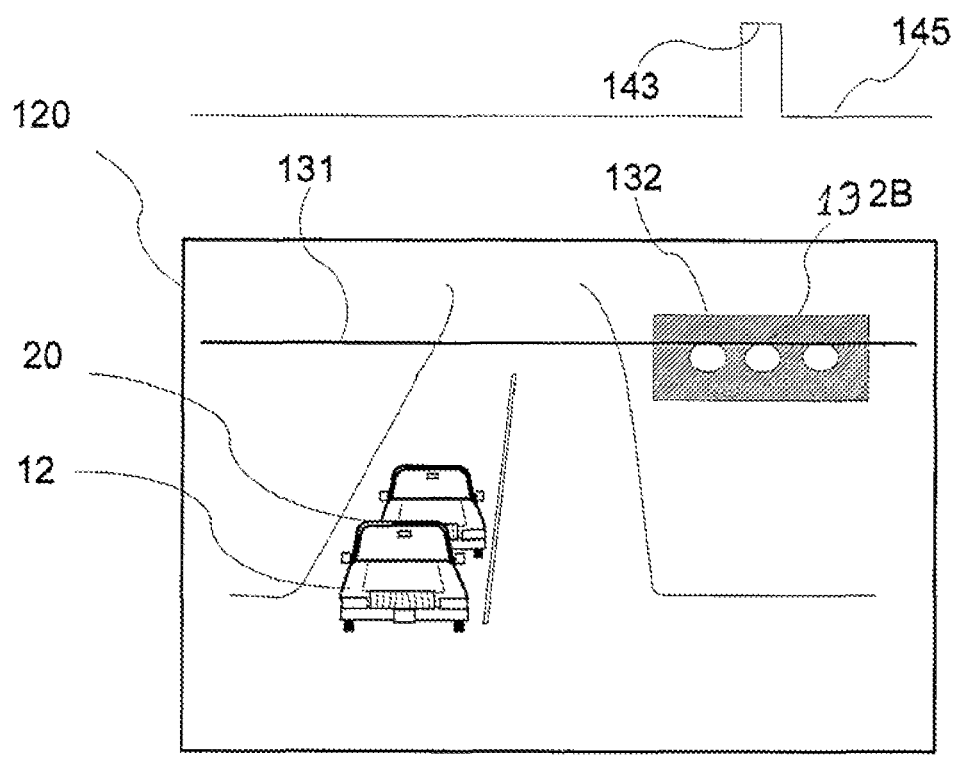
FIG. 12B illustrates video production for a scanline traversing the image of FIG. 12A.
Figure 12C:
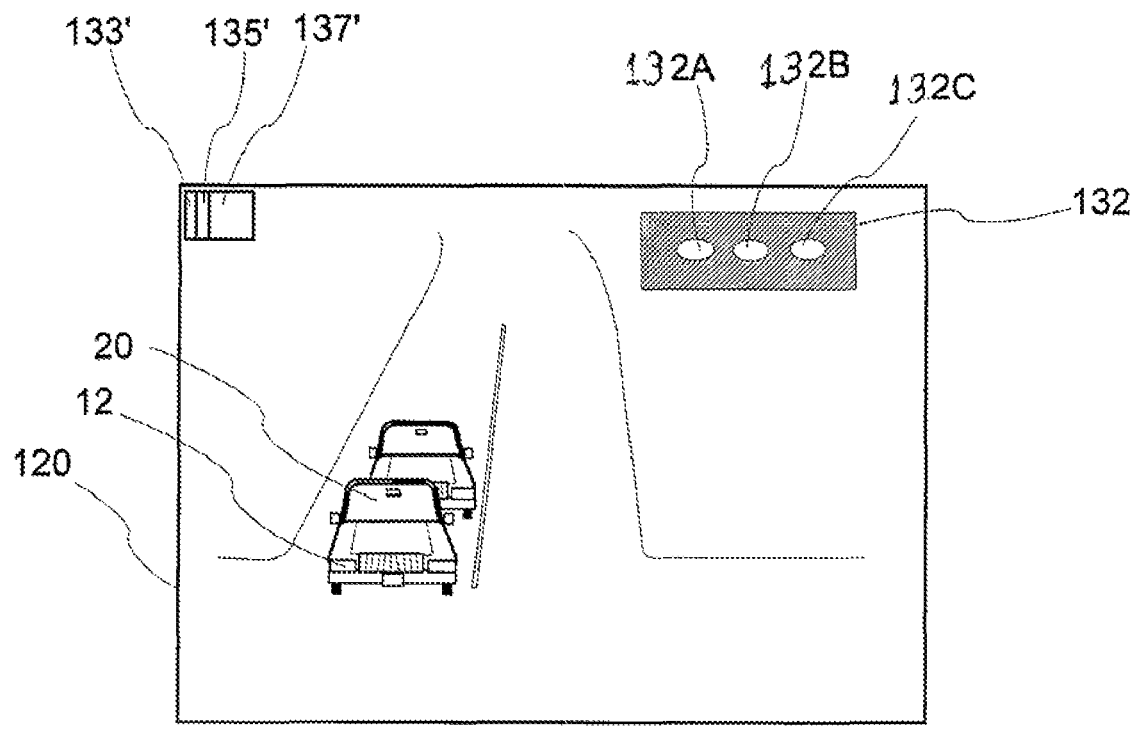
FIG. 12C is an illustration of an image frame being analyzed for matching templates with a process that is an alternate to that of FIG. 12A.

Referring to FIGS. 12A, 12B and 12C, a hypothetical captured video frame 120 is shown with a number of vehicles 20 and a traffic light 132. In FIG. 12B scan line 131 indicates one of the raster lines of the video. Assuming that only light 12B is illuminated and that the rest of the image along line 131 is dark or low contrast, then the resultant video 145 will have a single, relatively square pulse 143 associated with relatively bright light 12B.

In FIG. 12A successive subframe regions 133, 135, 137, 139 . . . are shown overlaying frame 120 in order to enhance the image processing by performing continual template comparison in disjoint regions, or even in regions that overlap as a template is stepped across the image raster-like, one or more pixels at a time (horizontally and vertically). A template is a small representation of an image or shape; for example, a number of contours representing the outline of a target image. A library of templates is stored in the memory of the processor (processor 82 of FIG. 10) and are compared against patterns in the visual elements in each of the of the subframe regions 133, 135, 137, 139 . . . . For an incremental progression of templates moving one or a few pixels at a time, see the sequence of templates 133'-137' in FIG. 12C.

Assuming traffic signaling device 132 is under consideration, this object will be analyzed over a succession of regions. The first region to intersect traffic signaling device 132 will be compared to each of the templates in memory. This region under consideration will be convolved with each of these templates to produce a sequence of scalar values representing the degree of matching to each of the various templates. In one embodiment, the convolution is performed by determining the percentage of the captured image that falls within the template.

For example, suppose the region under consideration contains circular object 12B (FIG. 12B). The edges of this circle will be detected and compared to the various templates. One of those templates will in fact be a circle, which if properly aligned over circular object 12B produces a 100% match in the convolution. In some circumstances alignment is off, and only a portion of an arc of circle 12B will be captured. Convolving the image of an arc of a circle with a circular template will produce a partial match but the correlation will still be significant. Likewise, if the captured image is a circle viewed at an angle (i.e., an ellipse) the convolution will detect a partial but significant correlation, which will be used as a predetermined criteria for determining template matches.

Figure 12D:
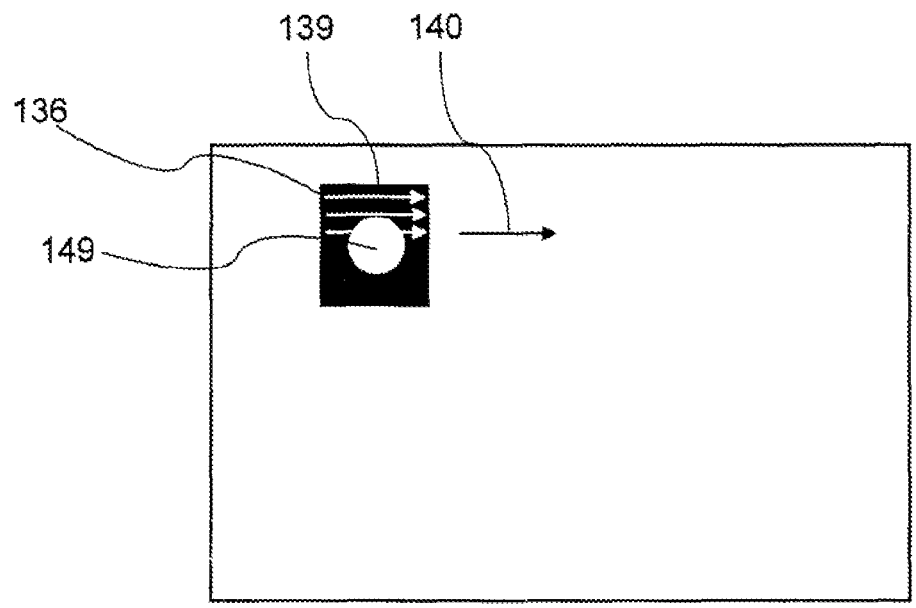
FIG. 12D is a schematic illustration of the template matching process associated with FIGS. 12A and 12C.
Figure 12E:
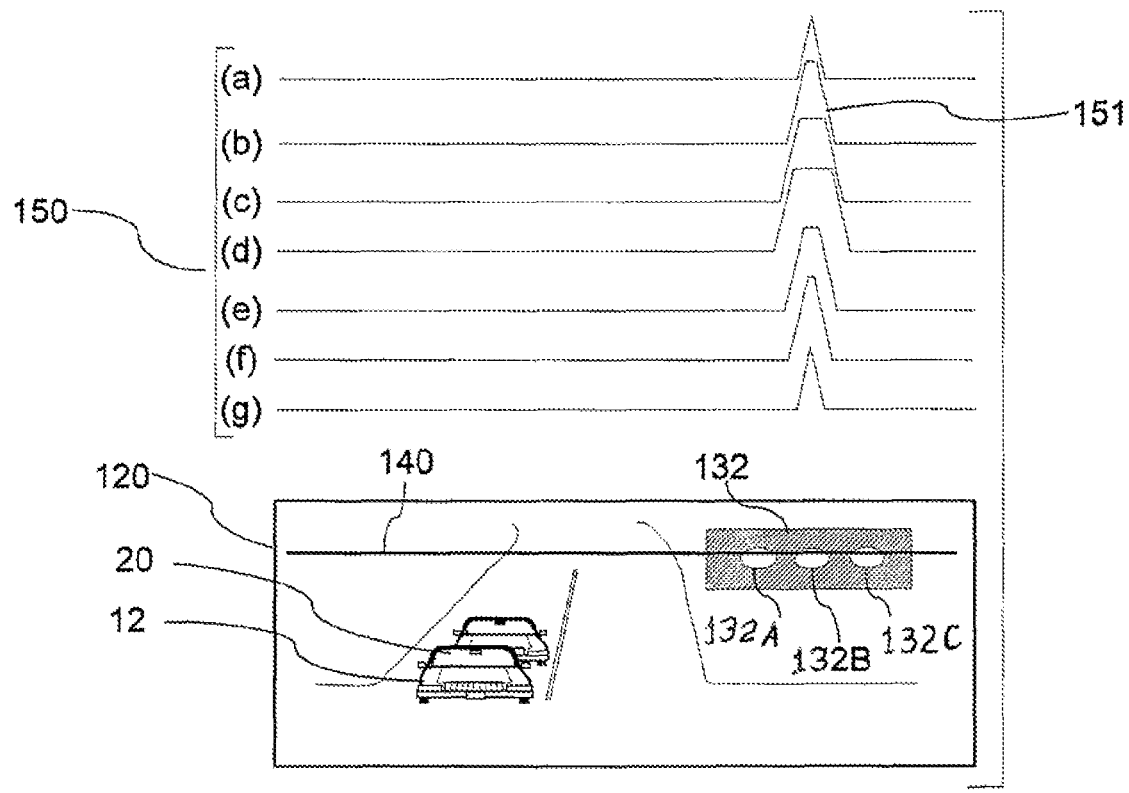
FIG. 12E is a composite illustration showing the outputs produced with the template of FIG. 12D when scanning across the image of FIG. 12C.

Referring to FIGS. 12D and 12E, previously mentioned template 139 is shown with a prototypical circle 149 so that the template can detect circular objects. Composition lines 136 indicate that the template is being compared against image data that was averaged using the mXm matrix (step S23 of FIG. 11). As shown in FIG. 12E the template moves incrementally along scanline 140 one or more pixels at a time before each template correlation (convolution). It will be understood that after each scanline is completed the template will be shifted one or more pixels downwardly to begin another parallel scanline. In each scanline the template performs successive correlations in regions that partially overlap other regions that were previously correlated in the current and previous scanlines.

The results of the successive correlations are shown in the family of outputs 150 (specifically outputs 150(a) through 150(g)). Each of these outputs is essentially zero (no correlation) except when the template 139 intercepts circular light 12B. (To simplify this Figure, it is assumed for now that only light 12B is illuminated and that the other lights 12A and 12C do not contrast with their background and therefore are not detected by the template matching process).

In FIG. 12E scanline 140 is shown intersecting the top of circular light 12B to produce partial correlation with template 136 (FIG. 12D). This partial correlation results in a trapezoidal pulse 151 in output 151(b) as template 139 moves from right to left across light 12B. The next scanline will be displaced downwardly to produce the larger trapezoidal pulse shown in output 150(c). The scanline after that intersects the center of light 12B and therefore produces the maximum pulse as shown in output 150(d). Subsequent scanlines will produce progressively decreasing pulses as shown in outputs 150(e) through 150(g).

As template 139 progresses across traffic signaling device 132 the scalar result of the convolution peaks as the analysis region arrives close to the center of the target image, here a circle. By sensing where this peak occurs the system can determine the approximate center of the target image. The system will consider any correlations significant only when they satisfy predetermined criteria.

Figure 13:
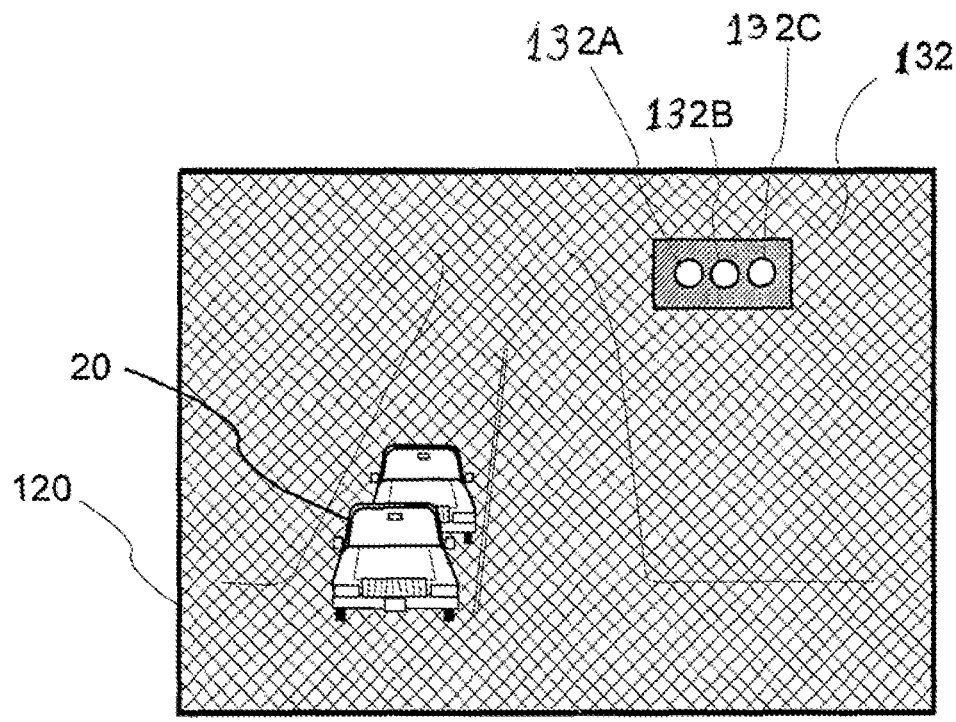
FIG. 13 illustrates a blanked image resulting from the template matching of FIG. 12E.

FIG. 13, shows the results of the template matching step of FIG. 12 (In this illustration template matching is assumed to occur for all three lights 12A, 12B, and 12C). Here, the three circular lights 12A, 12B, and 12C from the previously mentioned traffic signaling device 132 are passed but the surrounding regions are blanked. Other than the lights of traffic signaling device 132, all other regions of the scene are blanked (shown in crosshatch).

Template matching reduces the resource demand on processor 82 by identifying spatially regionalized visual elements in a captured frame where signal modulation is occurring or is most likely to occur. Template matching may be used in conjunction with the process described in the flowchart of FIG. 11.

In addition to detecting areas of modulation and receiving signals transmitted via light sources, the above described frame capture and analysis techniques may be used for other purposes. For example, a receiver located in a trailing vehicle may detect a leading vehicle that may or may not be currently transmitting a message. The receiver repeatedly examines the captured images to determine if there is a change in the size of the image of the vehicle or the vehicle's lights. As the trailing vehicle gets closer to the leading vehicle, the size of the vehicle or the vehicle's lights in subsequent captured frames would become larger. A processor interprets this change in size as a change in the distance between the vehicles and alerts the driver of the trailing vehicle by outputting an audio or visual signal such as a warning tone or an image on a display. The processor may alternatively be designed to deactivate a vehicle's cruise control as a precursor of braking. In an another embodiment, the processor may begin to actuate the vehicle's brakes as well.

Various types of sensors may be used to capture and identify the modulated light from an LED array and the like. While the foregoing employed relatively high resolution image acquisition, adequate information may also be obtained from low-resolution, wide-angle image sensors as well.

Figure 14:
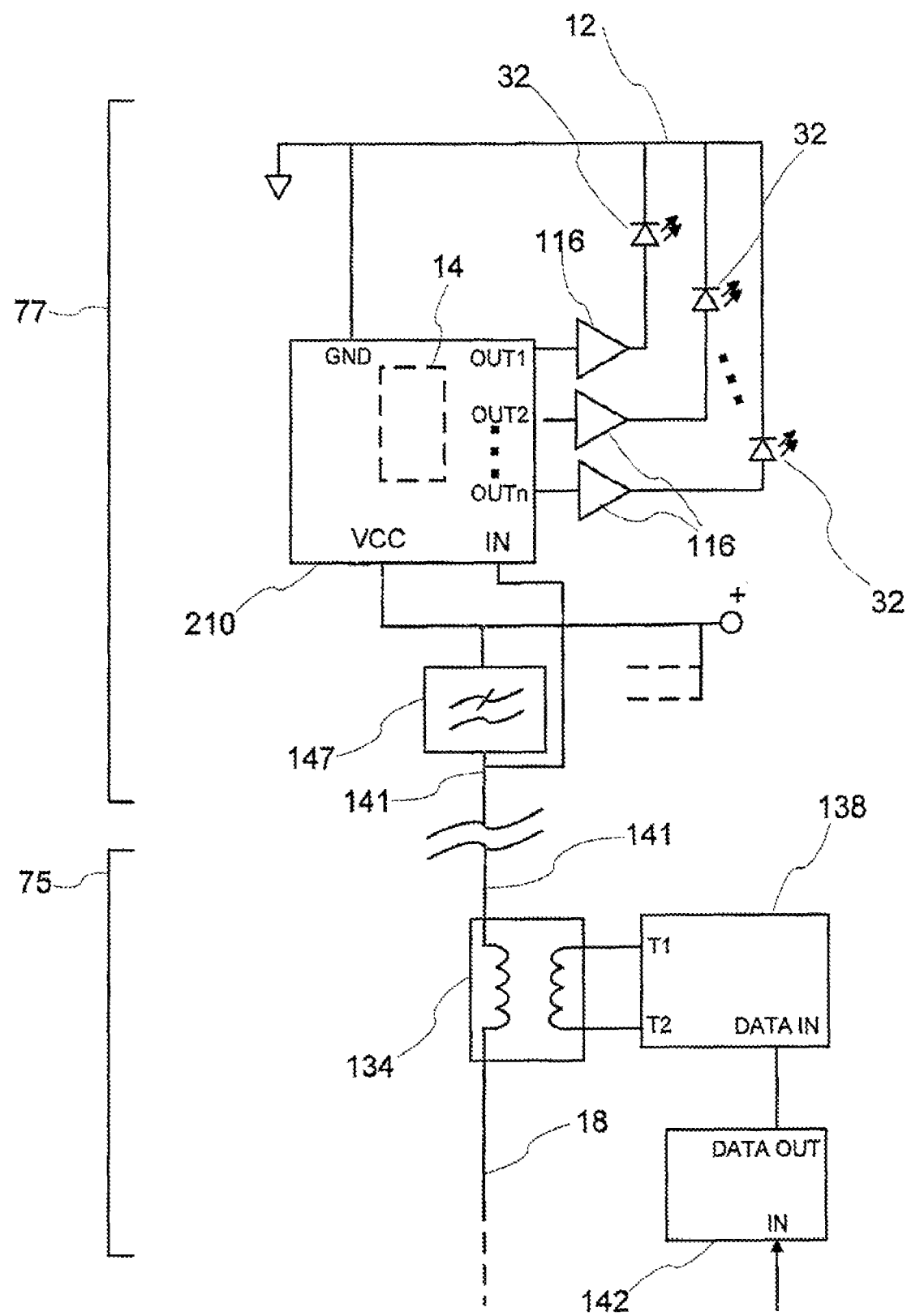
FIG. 14 is a schematic diagram of diagnostic apparatus that cooperates with the processors of FIG. 2, 7, or 9.

Referring to FIG. 14, the previously mentioned vehicle lights (e.g., LED arrays 12/13 of FIGS. 3, 6A and 6B) are fitted with an additional diagnostic transmission element 75. Element 75 constitutes additional circuitry added to PCB 30 of FIG. 3 or to PCB 130 of one of the bulbs displayed in FIGS. 6A and 6B. Element 75 includes a data source 142 whose terminal IN connects to the previously mentioned processor (e.g. processors 10 and 110 of FIGS. 2, 7 and 9).

Terminal DATA OUT of data source 142 connects to terminal DATA IN of driver 138. Terminals T1 and T2 of driver 138 are connected to line coupler 134, which is arranged the same as the previously mentioned coupler (coupler 34 of FIG. 9). Accordingly, coupler 134 is electromagnetically coupled to the power line 141 line carrying potential +V of power supply 18.

Diagnostic device 77 may be mounted in the vehicle's passenger compartment for the diver's benefit. In particular, the previously mentioned line 141 carrying potential +V of power supply 18 connects directly to terminal IN and indirectly through low pass filter 147 to terminal VCC of processor 210. Terminal GND of processor 210 is grounded. Terminals OUT1 through OUTn of processor 210 are connected through respective amplifiers 116 to the anodes of corresponding LED 32, whose cathodes are grounded.

Data source 142 outputs a signal that modulates potential +V of power supply 18 as previously described in connection with FIG. 9. This self test signal may be a periodically recurring encoded signal, a unique pilot frequency, or a distinctive heartbeat signal indicating that the self testing unit is operating properly. The lack of a particular modulation signal may indicate that a particular vehicle light or light modulation unit is no longer functioning.

Data source 142 receives on input IN status information transmitted from the processor (processor 10 or 110 of FIGS. 2, 7, and 9). This status information may be serial or parallel data or in some cases one or more simple flags. These flags can indicate individually (or as a combination) various faults detected by the processor. In still other embodiments data source number 142 may have its own sensors (not shown) to detect failures in the associated light. The sensed failures can be lack of continuity through a lamp, inappropriate short or open circuits, lack of proper power to the processor, etc.

In operation, the modulation applied to potential +V of power supply 18 by line modulator 134 is transmitted to terminal IN of processor 210. After processor 210 initially recognizes the modulated signal, it regularly checks for its continued existence. If one of the expected signals from the self-testing lights terminates, processor 210 will consider that a failure of the associated light. Alternatively, the modulated signal may itself carry information indicating the identity of the failed light and in some cases additional information about the type of failure. If one or more of the lighting elements are determined to be malfunctioning, processor 210 outputs a signal on one or more of terminals OUT(1) through OUT(n) thereby illuminating some or all of the LED 32 to indicate to the faulty lighting elements of the vehicle.

Figure 15:
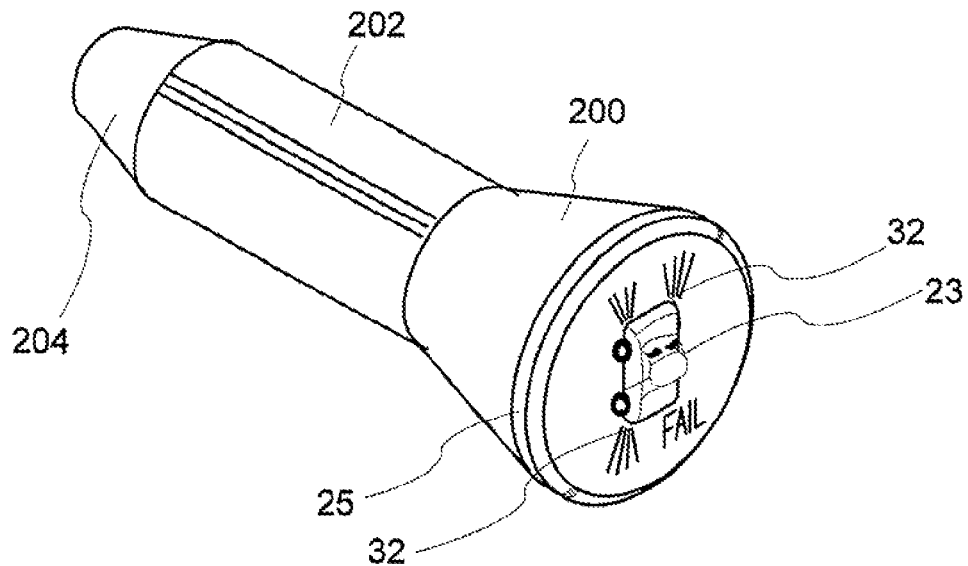
FIG. 15 is a perspective view of a diagnostic tool that may be used in connection with previously illustrated apparatus, including the apparatus of FIG. 14.

FIG. 15 shows a portable diagnostic device 25 containing the diagnostic circuitry 77 previously described in FIG. 14.

Status display 23 is located at the base of a frustro-conical head 200 that merges into main body 202, which has a tapered end 204. Main body 202 is sized to fit into a cigarette lighter or standard utility power socket (not shown) of a vehicle.

For this embodiment of diagnostic tool 25, display 23 has a permanent icon of a vehicle with underlying LEDs 32 mounted at several locations on the icon to represent the self-testing lights of the vehicle. LEDs 32 illuminate (or extinguish) to identify the malfunctioning lights or modulation units as described before in connection with FIG. 14. In another embodiment, processor 210 of FIG. 14 can produce messages indicating the malfunctioning lights or modulation units using messages such as "LEFT INSIDE TAIL" displayed on an LCD (not shown).

Figure 16:
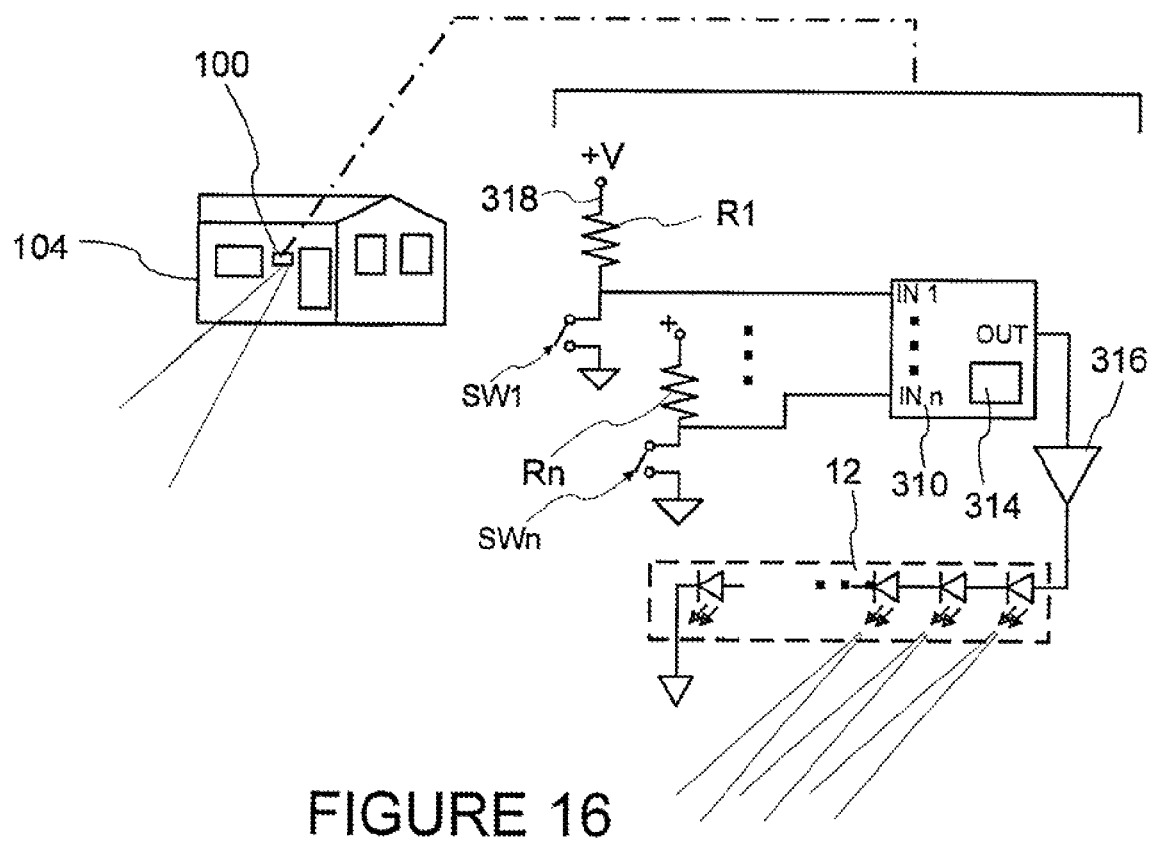
FIG. 16 is a schematic diagram illustrating a signaling device that is part of a system arranged to cooperate with the apparatus of the other Figures.

Referring to FIG. 16, a building such as house 104 is fitted with a panel 100 that operates as a house number sign containing the following electronic circuitry: Pull-up resistor R1 is connected between potential +V of power supply 318 and terminal IN1 of processor 310. Terminal IN1 is also connected to one terminal of switch SW1 whose other terminal is connected to ground. A number of other serially connected resistor/switch pairs (e.g., resistor Rn and switch SWn) are similarly connected between potential +V and ground with their junction connected to one of the terminals IN1 through INn of processor 310.

Processor 310 is a microcontroller having memory 314. Terminal OUT of processor 310 is connected to the input of amplifier 316 whose output is connected to the anode end of previously described LED array 12 whose cathode end is connected to ground.

The foregoing circuitry is packaged in panel 100 with LED array 12 exposed for transmitting light modulated to indicate the house number of house 104. Panel 100 may bear on its face glyphs indicating the house number. The panel 100 may be mounted at the front of house 104 and powered from a switch (not shown) located inside the house when the occupant desires the house number to be optically transmitted on the LED array 12 (although in some cases the device may be powered continuously).

The operation of the signaling device shown in FIG. 16 is as follows: A program stored on memory 314 of processor 310 begins running whenever processor 316 is powered. The program first looks at terminals IN1 through INn and interprets that switch pattern as a house number. In some embodiments the switches SW1-SWn may simply be read as digits of a binary number, but for embodiments where consumers operate the switches, other input methods such as an ordinary numeric keypad may be employed instead. In still other embodiments switches SW1-SWn are jumpers on a PCB which are cut in a custom pattern.

After the program determines the house number to be displayed, the appropriate pulse train is assembled by processor 310 and then repetitively produced at terminal OUT. Signal amplifier 316 brings the pulse train to an appropriate power level to drive LED array 12. Passing vehicles carrying the previously described receiver (FIG. 10) can capture the modulated light signal from LED array 12, which then may be converted to a numeric display or synthesized speech.

Figure 17:
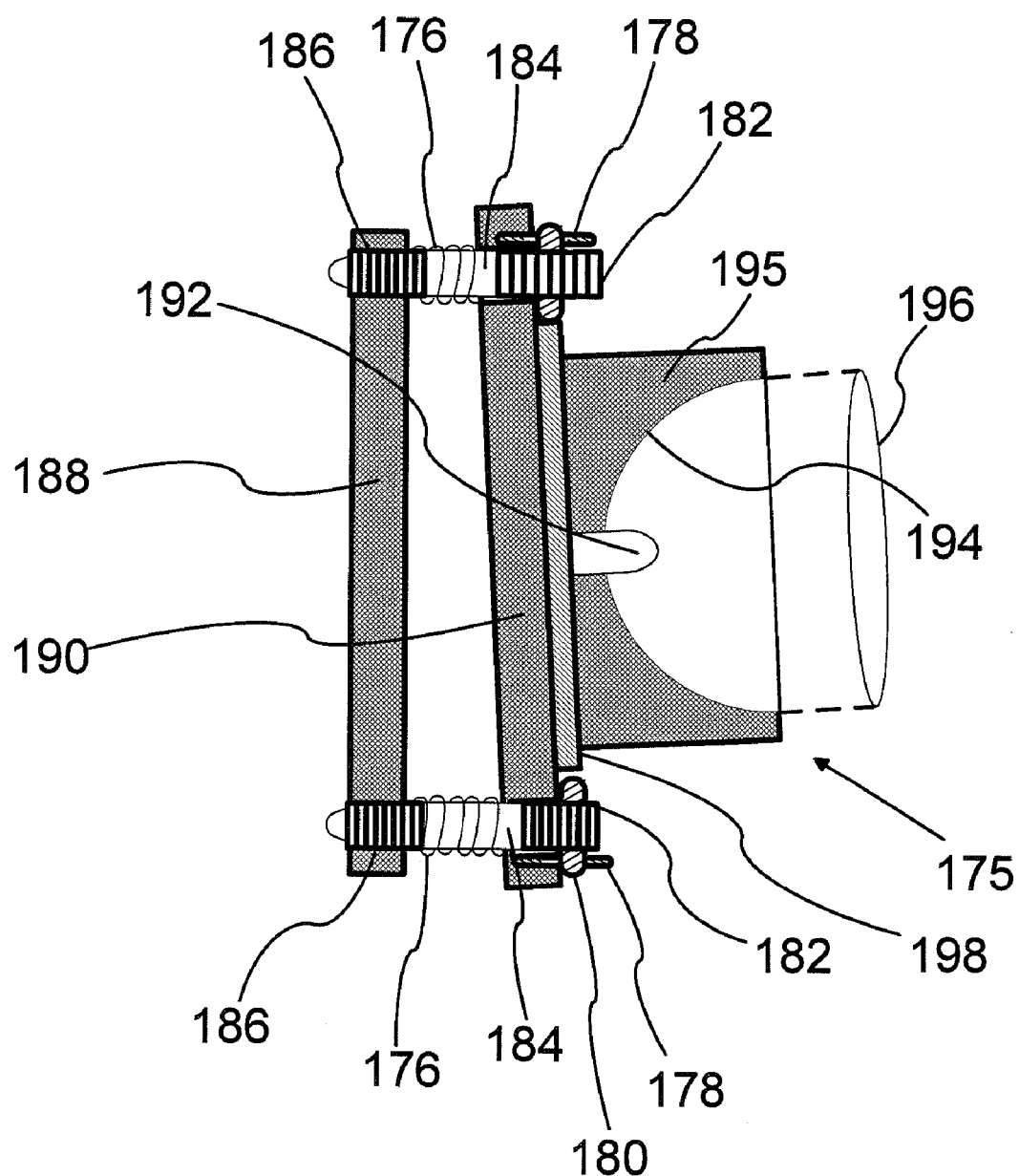
FIG. 17 is a cross-sectional view of apparatus employed in the arrangement of FIG. 16.

In some embodiments the foregoing light can be focused or directed to propagate toward receivers presumed to be at a height of about 1 to 2 meters. FIG. 17 shows transmitter 175 that can be used on panel 100 on the front of house 104 of FIG. 16. In particular, four shafts 184 (only two visible in this view) are screwed into base plate 188 at four corners of base plate 188. Adjustable plate 190 is slidably mounted on shafts 184 and captured thereon by nuts 180. Helical springs 176 are located around shafts 184 to bias plate 190 away from plate 188 and against nuts 180.

Shafts 184 have at opposite ends two threads 182 and 186 with different pitches. Fine pitch threads 186 are screwed into matching threads on base plate 188. Coarse pitch threads 182 are threaded into nuts 180, which have matching threads. Pins 178 projecting from adjustable plate 190 extend through holes or notches in nuts 180 to keep them from turning.

Board 198 is mounted to adjustable plate 190 and has the circuitry shown FIG. 16 for energizing LED 192. Parabolic reflector 195 with reflective surface 194 is mounted on board 198 with LED 192 projecting through an axial bore in the center of reflector 195. Lens 196 is mounted to the rim of reflector 195.

Transmitter 175 is mounted and adjusted in the following manner: Base plate 188 is mounted to the desired location with threaded shafts 184 screwed in place and springs 176 biasing plate 190 outwardly. The threads 182 and 186 of shaft 184 will all have the same orientation (for example, right handed threads) although threads 186 will be finer. Because of this thread difference rotation of shaft 184 will change the separation of plates 188 and 190 but at a rate proportional to the difference in pitch between threads 182 and 186. Because there are four separate threaded shafts 184 the angular orientation of the axis of reflector 195 can be adjusted. Assuming base plate 188 is mounted vertically the axis of reflector 195 can be the adjusted to change its angle of elevation and azimuth. Accordingly, light from LED 192 can be directed to shine in the expected direction of approach of a receiver-equipped vehicle (and/or in such a direction that light intercepts a passing vehicle mostly on the side and somewhat toward the front, with the vehicle's receiver being oriented accordingly). Light from LED 192 can be modulated by using the pulsed signal produced by amplifier 316 of FIG. 16.

Referring again to FIGS. 3 and 12, traffic signaling device 132 has lights 12A, 12B, and 12C. Many such traffic lights currently use LED arrays in place of conventional incandescent bulbs, although as noted before modulation with incandescent lights is possible at a slower data rate. Assuming an existing traffic light using LED arrays, PCB 30 (FIG. 3) may be installed in series with each LED array of traffic lights 12A, 12B, and 12C in a manner similar to that shown in FIG. 3. Alternatively, instead of employing the retrofit arrangement of FIG. 3, some embodiments may use the stand-alone bulbs shown in FIG. 6A or 6B in traffic signaling device 132.

In this embodiment, PCB 30 would begin sending a message repeatedly when power is applied to the corresponding red, amber or green lights 12A, 12B, and 12C. An encoded token symbol or a message encoded to represent the word OKAY, or GO would be transmitted on green LED array 12C when power is applied thereto. A token code or the encoded message CAUTION could be transmitted on amber LED array 12B when powered, and a token code or the encoded message STOP on red LED array 12A. These encoded messages are dynamic traffic information signals that may be interpreted by a vehicle's receiver, which will then produce an audible or visible message or other indication. Also, in some embodiments the received message could be used by the vehicle's control system. For example, a message that the preceding vehicle is braking can be used to reduce the speed dictated by a cruise control or, under appropriate circumstances, automatically apply the brakes. This decision to decelerate or break can be informed by analyzing an image of the preceding vehicle (or its brake lights) and determining whether the image is quickly growing, indicating rapid closure and potential collision. Also, in some embodiments the received message may be an objection to high beams in which case the receiving vehicle's control system can automatically switch to low beams.

For simple dedicated messages the circuit of FIG. 2 may be employed, but other embodiments may use the circuit of FIG. 7 to transmit more complicated variable messages that originate from data source 42. In some cases, the modulation circuits associated with each of the traffic lights 12A, 12B, and 12C may receive data from a single common data source 42. Under those circumstances, traffic signaling device 132 may transmit public-service messages regarding traffic, weather, or emergencies in addition to (or in place of) the ordinary stoplight information (stop/go/caution).

The foregoing concept can be applied to traffic signaling devices and signs in general by installing a modulated LED array that can transmit information in a similar manner. For example, a sign indicating the speed limit may broadcast the speed limit by appropriately modulating an LED array mounted to the sign. The transmitter mounted on or near the traffic sign may additionally or alternatively transmit information regarding traffic, weather, or emergencies. In addition, lone roadside transmitters may be strategically located to broadcast information to drivers, such as emergency, traffic, or other information relevant to vehicles traveling along a highway.

As another example, detour signs operating as a traffic signaling device may broadcast dynamic traffic information in the form of a detour message including alternate route information, presented as synthesized or pre-recorded speech. Alternatively, the transmitter may send a signal containing the message DETOUR as well as alternate route information in a format to be utilized by a vehicle's on board navigation system. The transmitter may also send a signal containing an image of a map indicating alternate route information that can be used by vehicles which are not equipped with a navigation system but have displays capable of presenting the image. In addition transmitters mounted on each detour sign along the alternate route may additionally transmit short directives such as TURN RIGHT, TURN LEFT, or DETOUR END in several formats so that the driver may receive an audible or visual indication of the detour instructions. Vehicles receiving this information may be suitably-equipped to filter this information. For example, the information may be filtered to accept only traffic, navigation, or other designated information.

Figure 18:
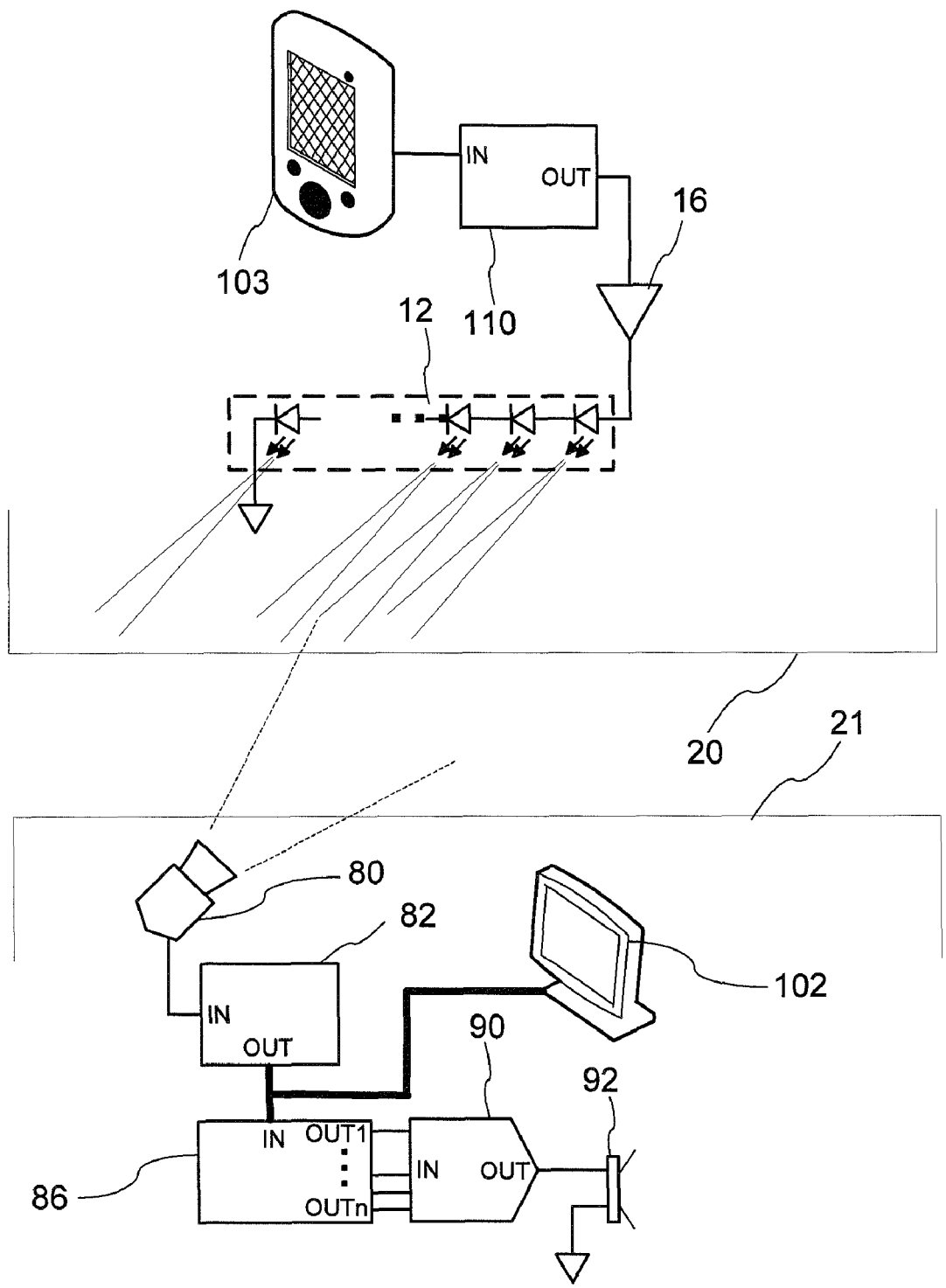
FIG. 18 is a schematic block diagram of intervehicle communications system employing apparatus that is an alternate to that previously illustrated.

Referring now to FIG. 18 vehicle 20 is transmitting modulated light from array 12 is sending a message to previously mentioned luminance sensing device 80 of vehicle 21. Previously illustrated processor 110 (FIG. 7) is shown as before with its output terminal OUT connected through power amplifier 16 to LED array 12. Unlike before, input terminal IN of processor 110 is connected to an output from PDA 103, which then acts as a portable personal data source.

Previously illustrated devices 82, 86 and 90 (FIG. 10) are connected as before to image sensor 80, and speaker 92. Unlike before, display 102 connects to terminal OUT of processor 82.

The devices of FIG. 18 operate as follows: The operator of vehicle 20 can store a variety of messages on PDA 103. For example, PDA 103 can be programmed to display a number of standard message, such as TAKE NEXT EXIT. Using PDA 103, a message is selected from the list displayed on the PDA in order to apply a corresponding output signal to terminal IN of processor 110. In a manner similar to that previously described, processor 110 then outputs a corresponding signal pulse train at its terminal OUT, which is connected to the input of signal amplifier 16. Signal amplifier 16 brings the pulse train to an appropriate level to drive LED array 12 which is then modulated with the pulse train.

In a manner similar to that previously described, imaging sensor 80 captures sequential frames of the scene containing vehicle 20 and its LED array 12. Processor 82 analyzes these successive images as previously described to extract the modulated signal. The extracted signal is then output at terminal OUT of processor 82 with two destinations. The signal is sent as image data to display 102, which is designed with appropriate graphics processors so that incoming data is converted into a display image. Secondly, the signal is sent to processor 86 to be converted into a digital representation of synthesized speech for subsequent conversion into an analog signal in converter 90, which drives speaker 92.

In addition to sending standard stored messages, custom messages may be composed and sent on-the-fly; or data such as word processing documents, spreadsheets, or JPEGs may be sent from PDA 103. Besides PDAs, other devices such as laptop computers may be used to generate messages.

In some embodiments, the vehicle 20 may be an emergency vehicle that is broadcasting messages using an omnidirectional light source or an emergency flasher as typically used on emergency vehicles. Messages may be entered by emergency personnel using a PDA, laptop computer or other device in order to broadcast official messages to vehicles in the vicinity.

Figure 19:
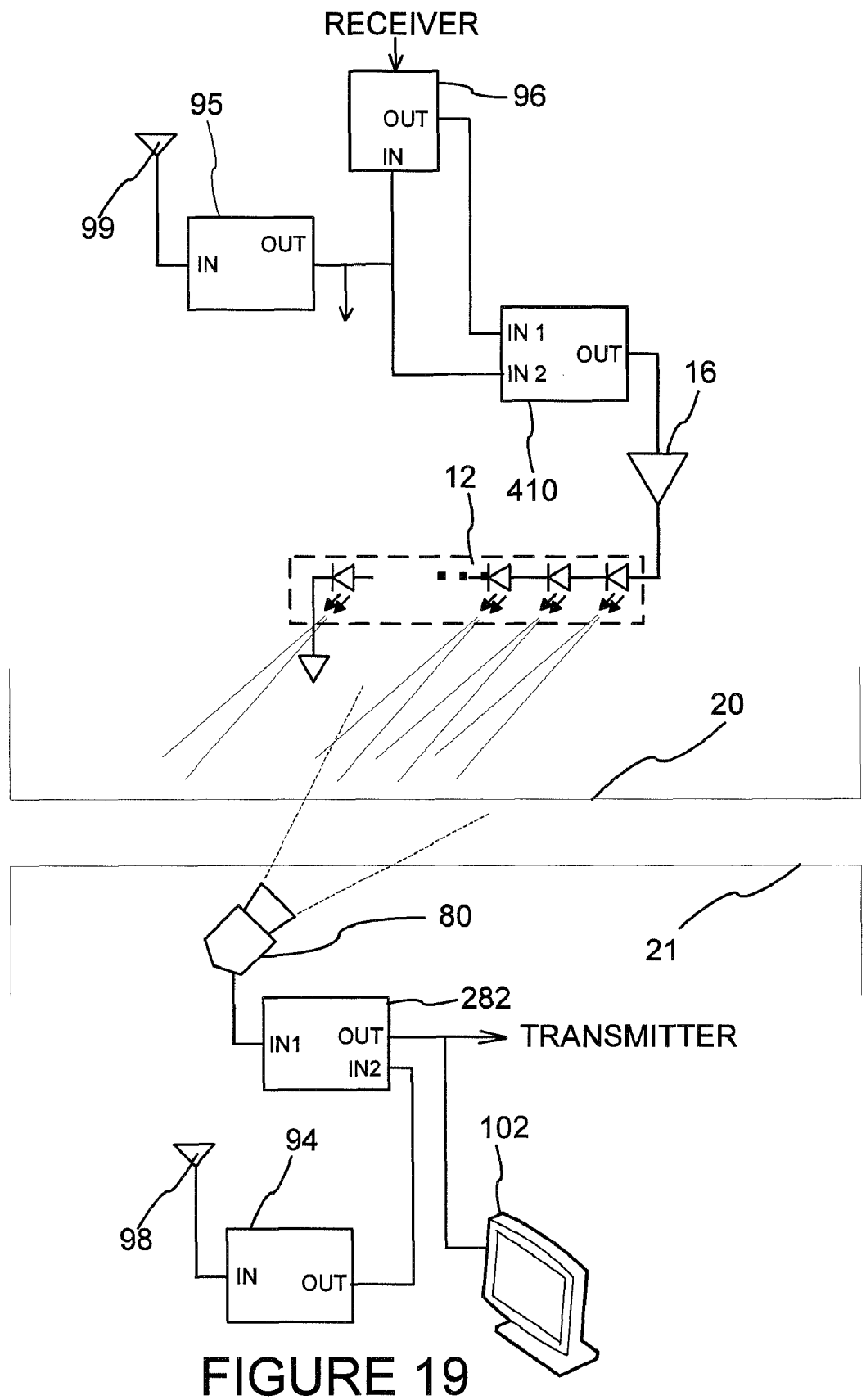
FIG. 19 is a schematic block diagram of a system that is an alternate to that of FIG. 18.

Referring to FIG. 19, publishable, positional information is communicated between two oncoming vehicles 20 and 21. For simplicity, vehicle 20 is shown with a transmitting system and vehicle 21 with a receiving system, but it will be appreciated that both vehicles could additionally have a complementary transmitting and receiving system in order to establish two-way communications.

Previously mentioned image sensor 80 connects to input IN1 of processor 282 whose output terminal OUT connects to display 102 and a local transmitter similar to that in vehicle 20. Input terminal IN2 of processor 282 connects to output terminal OUT of GPS (global positioning system) receiver 94, whose input terminal IN connects to antenna 98.

GPS receiver 94 continuously determines the vehicle's position by interacting in a known manner with satellites using antenna 98. The publishable positional information is provided in a conventional manner at output terminal OUT of receiver 94 and then relayed through processor 282 (input terminal IN2 to output terminal OUT) to the display 102. This image may show the location of vehicle 21 on a map.

In vehicle 20, antenna 99 connects to input terminal IN of GPS receiver 95 whose output terminal OUT connects to the input terminal IN of processor 96 and input terminal IN2 of processor 410. The output terminal OUT of processor 96 connects to terminal IN1 of processor 410, whose output terminal OUT connects through power amplifier 16 to previously illustrated LED array 12. Processor 96 also connects to a local receiver similar to that shown in vehicle 21.

As vehicle 20 travels, GPS receiver 95 continuously determines the vehicle's position (i.e., travel history) by interacting with satellites using antenna 99. Vehicle position information continually provided at terminal OUT of GPS receiver 95 is analyzed by processor 96. Processor 96 is programmed to process this publishable, positional information and generate a table listing discrete positions of vehicle 20 distributed over a preceding period of time; in this case, approximately 20 minutes.

The publishable information stored in this table is provided at terminal OUT of processor 96 to processor 410, which converts this publishable information into a pulse train on terminal OUT, in a manner similar to that described in connection with processor 110 of FIG. 7. This pulse train is applied through amplifier 16 to LED array 12, which may be a front parking light, a mirror light, or a dedicated light transmitter on the front of vehicle 20. In some embodiments the vehicle's headlights will be modulated.

As vehicle 21 approaches vehicle 20, previously mentioned imaging sensor 80 captures sequential frames of a scene containing images of vehicle 20 and its array 12, which is transmitting a modulated light signal as previously described. The sequential images from imaging sensor 80 are applied to processor 282, which is designed to analyze the received signals in a manner similar to that described in connection with processor 82 of FIG. 10. This received information can be arranged to reveal either the position of vehicle 20 at various times, or, after processing (in either vehicle), the speed of vehicle 20 at various positions along a highway. Moreover, this captured information may be supplemented with travel data received from similar oncoming vehicles having transmission equipment similar to that in vehicle 20.

This received information about the travel history of vehicle 20 and other vehicles may not be directly relevant to the driver of vehicle 21, but may be useful to other vehicles. In fact it will be understood that vehicle 20, using its own receiver, has collected just this type of information from vehicles recently passed. Accordingly, the publishable information collected by vehicle 20 about other vehicles represents traffic conditions vehicle 21 will soon confront. With this in mind, vehicle 20 transmits through LED array 12 publishable information about the travel history of vehicles recently passed by vehicle 20. Thus, vehicle 20 will transmit and vehicle 21 will receive not only the travel data concerning vehicle 20 but the travel data collected by vehicle 20 concerning other oncoming vehicles.

The publishable information collected by vehicle 20 concerning other oncoming vehicles is received by image sensor 80 and sent to processor 282 for analysis. Processor 282 will sort speed data from the vehicles' history based on location. This location can be included explicitly in the transmitted data or can be derived by integrating the speed data over time. Processor 282 uses this publishable information to determine traffic conditions and prepare a graphical display for display 102. In this embodiment the roads on the map shown by the display 102 can be highlighted with a specific color correlated with the traffic conditions on the road.

For example, if vehicle 20 while traveling southbound passes an accident that has been blocking northbound traffic for the last hour, the travel information vehicle 20 receives from those stopped vehicles will indicate that the vehicles have been stopped for at least the last 20 minutes. Vehicle 20 continues to travel southbound past the traffic jam broadcasting its own travel data for the last 20 minutes as well as travel data received from vehicles passed; in particular those vehicles stopped due to an accident on the northbound lane.

Vehicle 21, when approaching vehicle 20 captures this broadcast information and processes it as previously described. The driver of vehicle 21 noticing the stopped vehicles ahead (where a section of the road is marked in red on the display 102) may then decide to take another route with less traffic. Furthermore, vehicle 21 will use its own transmitter to relay its travel history and that travel history of vehicles it passes to oncoming traffic.

In another scenario, information related to roads or highways other than the one currently being traveled may be relayed. For example, if vehicle 20 while traveling westbound passes an accident that has been blocking eastbound traffic for the last hour, the travel information vehicle 20 receives from those stopped vehicles will indicate that the vehicles have been stopped for at least the last 20 minutes. Vehicle 20 exits the highway and enters another highway traveling southbound. Vehicle 20 travels southbound broadcasting its own travel data for the last 20 minutes as well as travel data received from vehicles passed; in particular those vehicles stopped due to an accident on the westbound lane of the highway previously traveled.

Vehicle 21 traveling northbound, when approaching vehicle 20 captures this broadcast information and processes it as previously described. The driver of vehicle 21 originally intending to travel eastbound on the highway vehicle 20 was previously traveling on, noticing that traffic is stopped on the eastbound side of the desired highway (where a section of the road is marked in red on the display 102) may then decide to take another route with less traffic. Furthermore, vehicle 21 will use its own transmitter to relay its travel history and that travel history of vehicles it passes to oncoming traffic.

A vehicle so equipped with a forward facing image sensor may receive modulated signals from various sources and interpret the signals to produce a map of traffic conditions in the vicinity. Information gathered from modulated light from traffic lights, LED arrays on roadway signs, the lights of other vehicles, and other signal sources could then be utilized in a variety of ways. For example, a navigation program running on an onboard computer may compare traffic information received from various sources to the vehicle operator's intended route to determine if another route would be faster or determine the fastest of all possible routes.

Figure 20A:
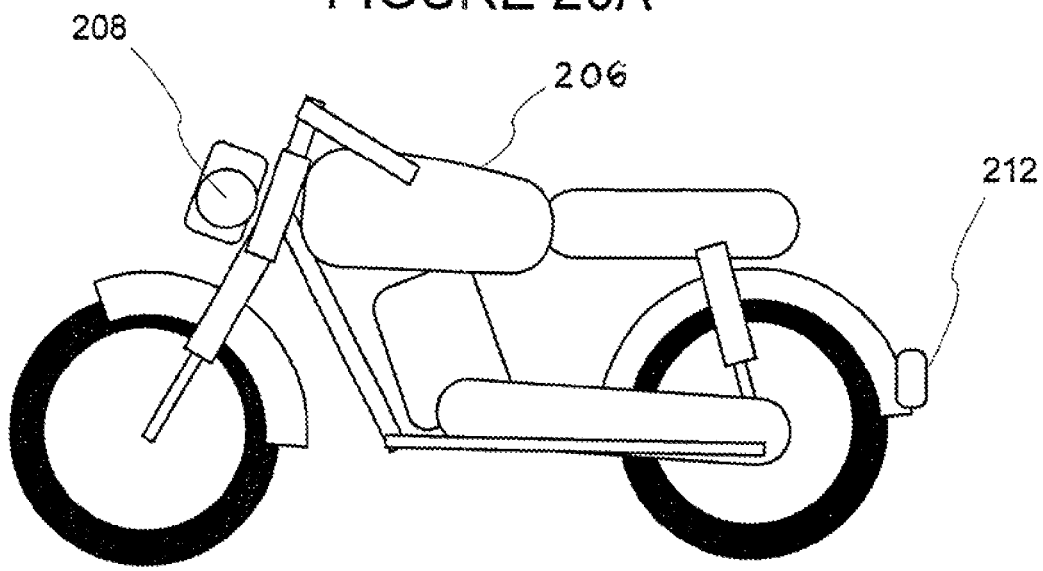
FIG. 20A is an elevational view of ac motorcycle fitted with a plurality of transmitters.
Figure 20B:
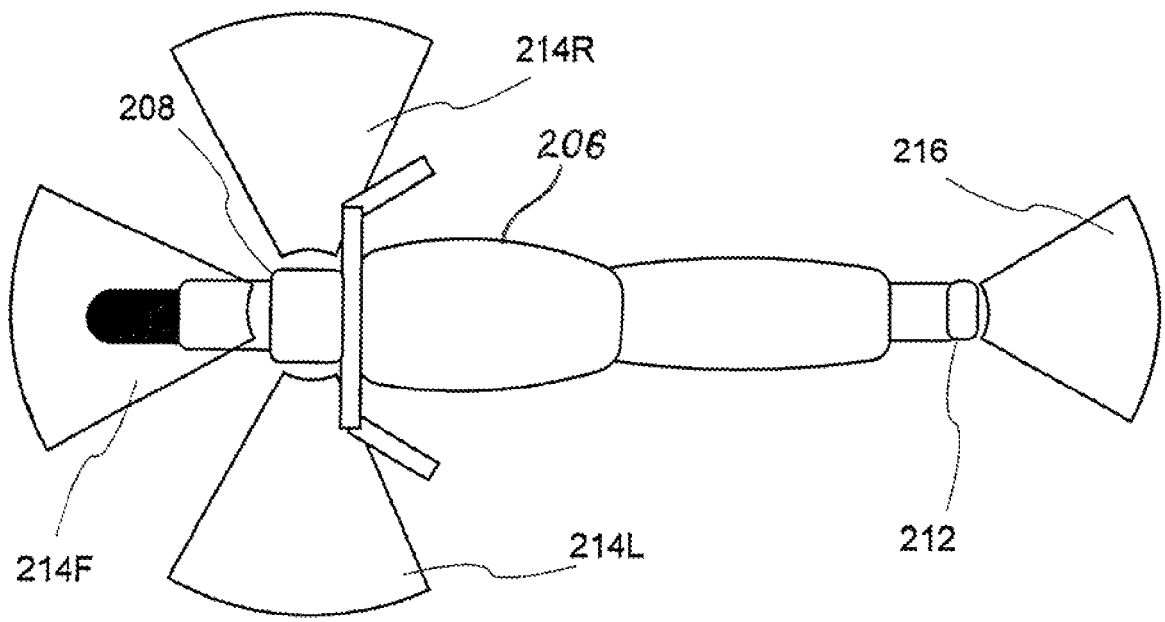
FIG. 20B is a plan view of the motorcycle of FIG. 20A.

Referring to FIGS. 20A and 20B, a motorcycle 206 is equipped with a plurality of signalers 208 and 212 employing LEDs or other light emitting devices driven in a manner similar to that previously described in connection with FIG. 2, 7, or 9. In this embodiment signaler 212 is a brake light/turning signal assembly that can either be driven conventionally or modulated to produce an encoded signal in rearwardly projecting beam 216. Assembly 208 includes a headlight that produces a forward beam 214F and turning signals producing right beam 214R and left beam 214L.

Signalers 208 and 212 can produce modulated and encoded signals of the type previously described. In particular, beams 214R and 214L may produce encoded signals indicating that the rider of motorcycle 206 intends to change lanes.

Figure 21:
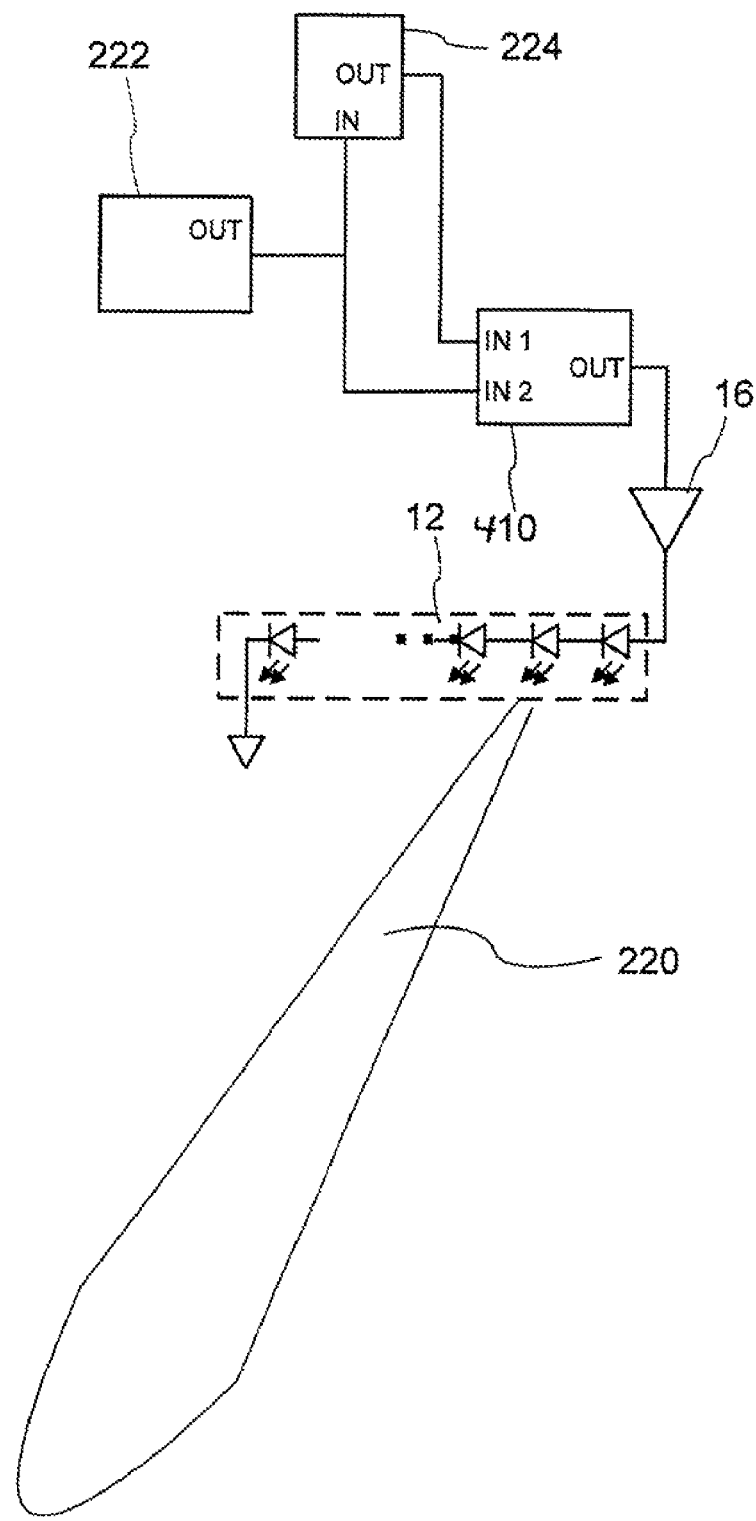
FIG. 21 is schematic diagram of another embodiment showing a more general case of modulated light being transmitted from a building or sign.

FIG. 21 shows a schematic block diagram of the transmitter of FIG. 2 suitably modified and installed on a building such as indicated in FIG. 16.

Utility tracking entity 222 has output OUT which outputs to both processor 410 at input IN2, and location modulation means 224, the output of which is presented to processor 410 at input IN1. Processor 410 generates a signal suitably modulated and presented to amplifier 16, which amplifies the signal and passes it to LED assembly 12, which is similar to assembly 12 of FIG. 16 used for illumination of street numbering.

Utility tracking entity 222 provides an output stream suitably encoded to provide a signal at terminal OUT indicative of at least one of: resource usage, cost, fuel cost, potential or a combination of both. Suitably encoded data stream from output OUT of utility tracking entity 222 is presented to input pin IN2 of processor 410.

Entity 224, provided at input pin IN, with data stream from pin OUT of utility tracking entity 222, is a circuit, printed, integrated, or a combination thereof. Entity 224, not shown physically, is equipped with a jumper arrangement to encode at least one of street number, fuel price, energy price per unit, or a combination thereof. This is passed in turn to processor 410, equipped with memory means (not shown) wherein it is suitably amplified by amplifier 16 and encoded to modulate LEDs on assembly 12, with appropriate encoded optical information. Beam 220 is oriented by means of the orientation entity of FIG. 17.

Light from so generated is coincidentally used to illuminate at least one of: the street number, to indicate the price of fuel, the price of energy, or a combination thereof.

Use of this arrangement may coincidentally make use of a portable navigation device such as GPS, PND, or cellphone infrastructure to encode the location at which this data is taken with at least street number or location information.

Figure 22:
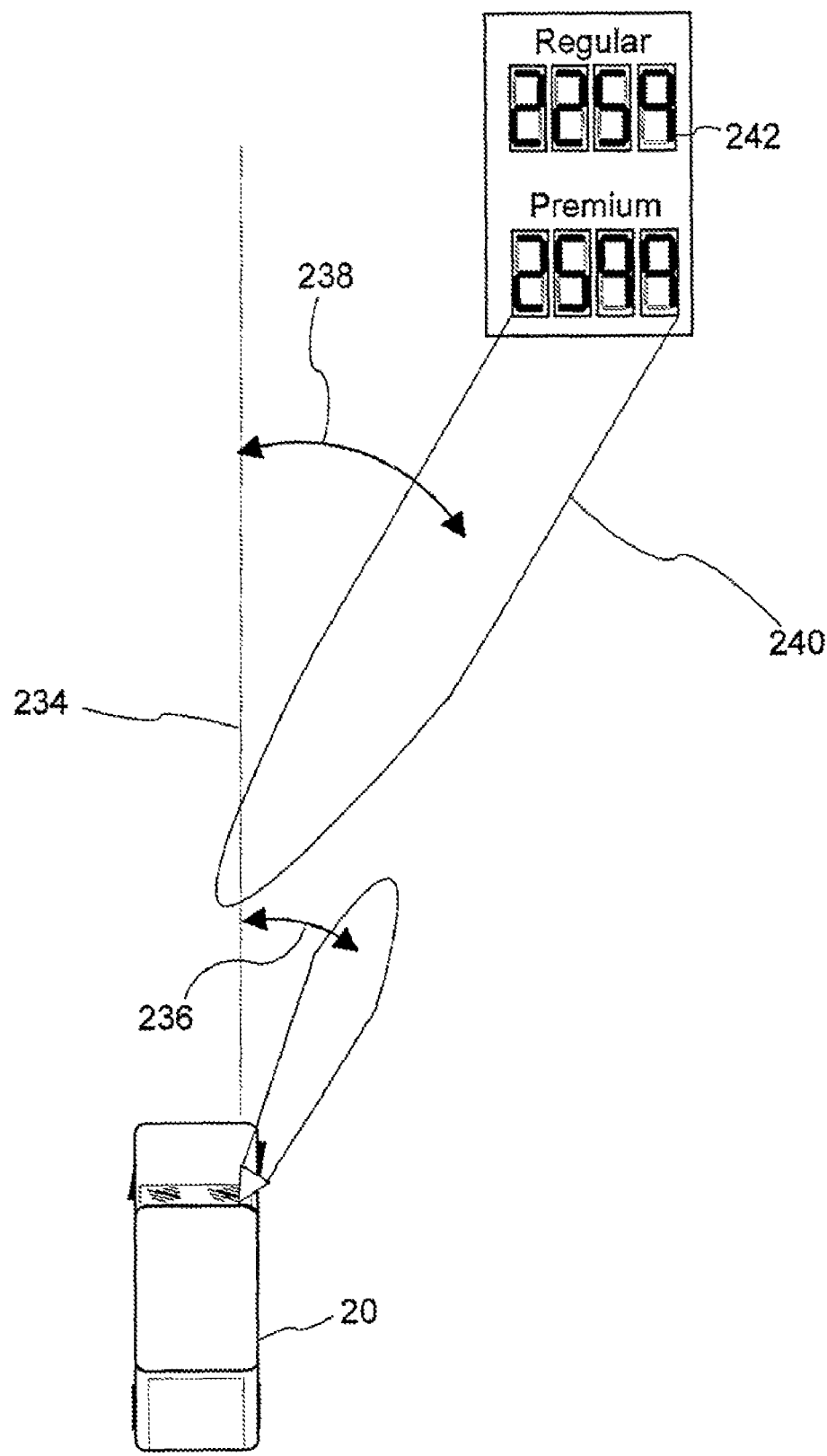
FIG. 22 is a plan diagram showing the transmitter of FIG. 21 incorporated in a fuel sign and communicating with a vehicle.

FIG. 22 shows a transmitter operating in the visible part of the spectrum that is installed on a sign 242. Sign 242 can be driven to display different prices and is therefore considered adjustable signage. Fuel price sign 242 contains the circuitry of FIG. 21 (not shown in FIG. 22). The circuitry is suitably programmed to have emitted beam 240 encoded to transmit fuel price. The beam 240 is oriented at angle 238 to intersect the likely direction of travel 234 of vehicle 20. Vehicle reception angle 236, coincidentally the same as sign transmission angle 238 is the angle in plan view between the vehicle axis and the perceived reception angle. It will be understood that beam 240 is oriented such that the optical transmission beam transmits to a point at a standard height above the ground at the location of vehicle reception. The anticipated reception angle is suitably oriented, within practical alignment limits, at the opposite angle so as to maximally receive the transmitted beam.

In another embodiment, not shown, the vehicle transmits an modulated optical signal with sufficient strength so as to be capable of reception at the sign. This vehicle transmitted signal is encoded with a network address permitting addressing of where the information concerning the price of fuel can be sent, such that an occupant of the vehicle can further use this or information based on this price.

In some embodiments the luminance sensing apparatus located on vehicle 20 accumulates data pertaining to the price of fuel and location, which was optically encoded and radiated in essence in the visible spectrum. The accumulated data is relayed to a network that accumulates this information, tracks vehicle position and makes a calculation as to where the most efficient location to refuel is based on available information. This calculation is made available to at least one member of a fleet of vehicles. The data is optically encoded with an LED in sign 242, which employs a reflector mounted at a 45 degrees to the expected path from which vehicle 20 arrives in plan view and oriented in a descending path inclined 15 degrees to level, in such a way as to intersect the middle of a vehicle in the position most likely to be occupied at least at one point in time by an oncoming vehicle, at a height of 1.5 m above ground. Vehicle 20 may have a sensing apparatus employing a PIN diode, with a reflector, mounted about 1.5 m above ground, and in such orientation as to optimize capture of rays arriving from 45 degrees ahead of the vehicle, passenger side, and arriving from 15 degrees above the horizontal.

Figure 23A:
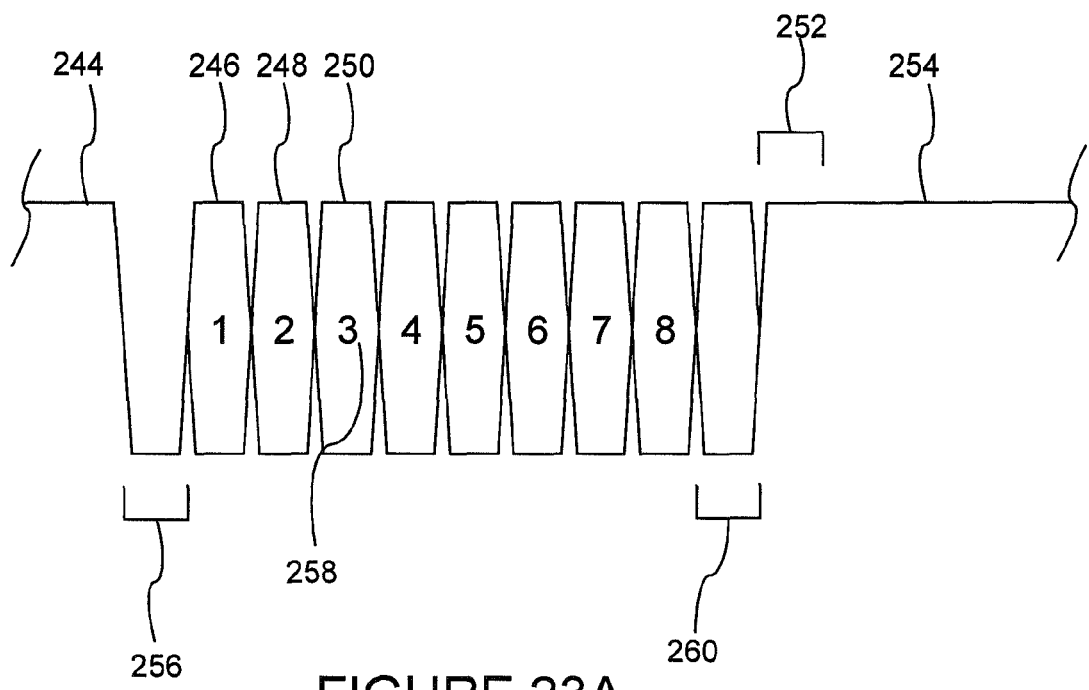
FIG. 23A shows a standard 8-bit word format that may be used with the processor of FIG. 2.

Referring to FIG. 23A, a standard 8-bit word format has initial signal level 244, considered here to be the illuminated state, start bit 256, parity bit 260, stop bit 252 and subsequent level 254. In the simplest configuration the data following start bit 256, occurs at expected bit times 246, 248, 250 and so on for bits 1,2,3 and so on shown by 258. This is shown with an 8 bit word. Other lengths of word are equally acceptable. Bit position 260 is an optional parity bit. Level 252 is a non-optional stop bit and must be of sufficient length so as to permit the perception of the light being illuminated constantly To ensure that the beam is always illuminated, the state of the data stream between modulations is to remain in the illuminated state, 244, and after the modulation word, state 254.

The application benefits from redundancy of signal. This redundancy can be in different forms. The first and simplest form is the parity bit 260 of FIG. 23A, which is appended to the data word to indicate whether the number of bits in the word is odd or even. This permits a form of error detection.

The foregoing signal can be further enhanced by including error detection. This error detection can be any one of several known schemes and can include error correction, encoding redundancy, and voting filtered signal recovery.

Figure 23B:
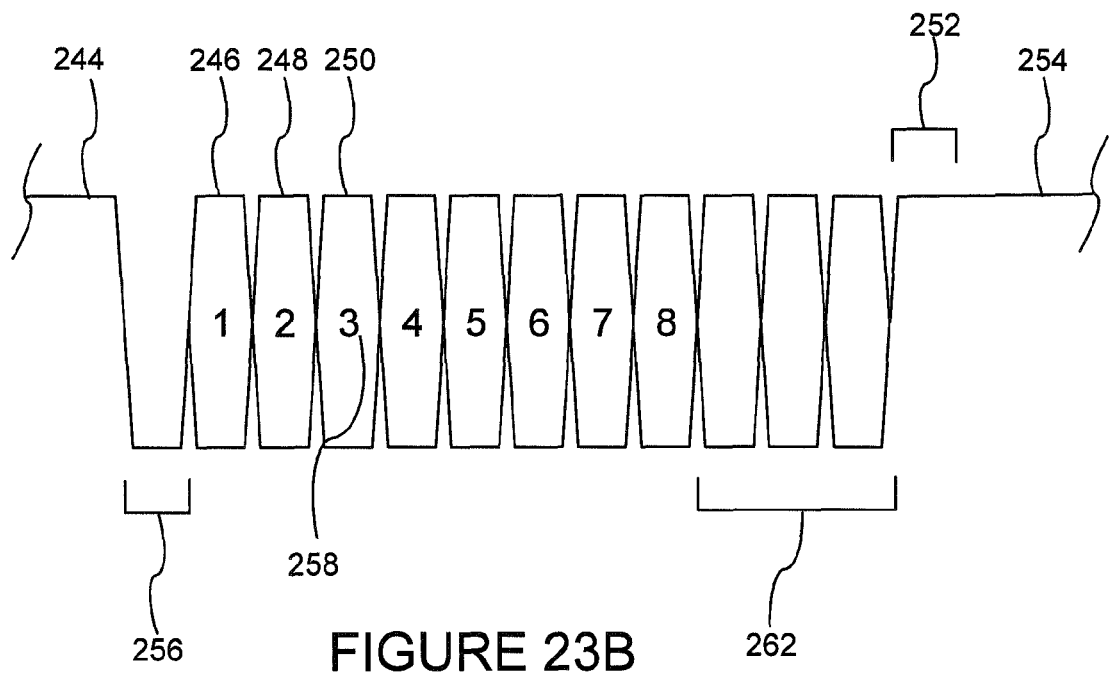
FIG. 23B shows an 8-bit format word with added redundancy for error detection or correction purposes that is an alternate to that of FIG. 21A.

FIG. 23B shows the same standard 8-bit format word with even more redundancy permitting error correction and greater error detection at the receiving end. In FIG. 23B several bits 262 are appended to the basic word (taken here as 8 bit, but can be any number). The extra bits 262 permit error correction, an important aspect in this application where many different visible optical noise sources exist. Processing of this additional data at the receiving end of the link permits a more robust link.

Supplementing the data with redundant or semi-redundant information, shown in either case as bits 262, permits the recovery of the correct information due to noise, such as other light sources. In an alternate embodiment this can be a cyclic redundancy checksum or CRC, as it is commonly known in the industry.

Data words that are sent can be doubled up, tripled up or sent in any number of multiples such that failure of corrupted words shall not necessitate loss of data. A simple arrangement for recovery includes data voting on a word by word basis where words are tripled up and the odd word is discarded. An additional aspect of this is to use a data link in the opposite direction to indicate reception of the data, such as transmission control protocol (TCP).

As shown in FIGS. 23A and 23B, any of the bits can be in any state. This might necessitate either further data formatting before transmission, or disallowing certain members of the data set (unless the entire data word is always transmitted with the entire time from start to finish being less than the flicker duration threshold perceptible to humans). The exemplary modulator shown in FIG. 24A alleviates this difficulty.

Human perceptibility limits are on the order of 30 times per second or roughly on the order of 30 ms. Optical sensors work by receiving the light, which is in turn turned into a charge, which increases with exposure time. The optical path will become more robust, and the likelihood of reception will be increased if the sensor can integrate for a larger fraction of the time window permitted by the potentially changing vehicle/infrastructure geometry.

Figure 24A:
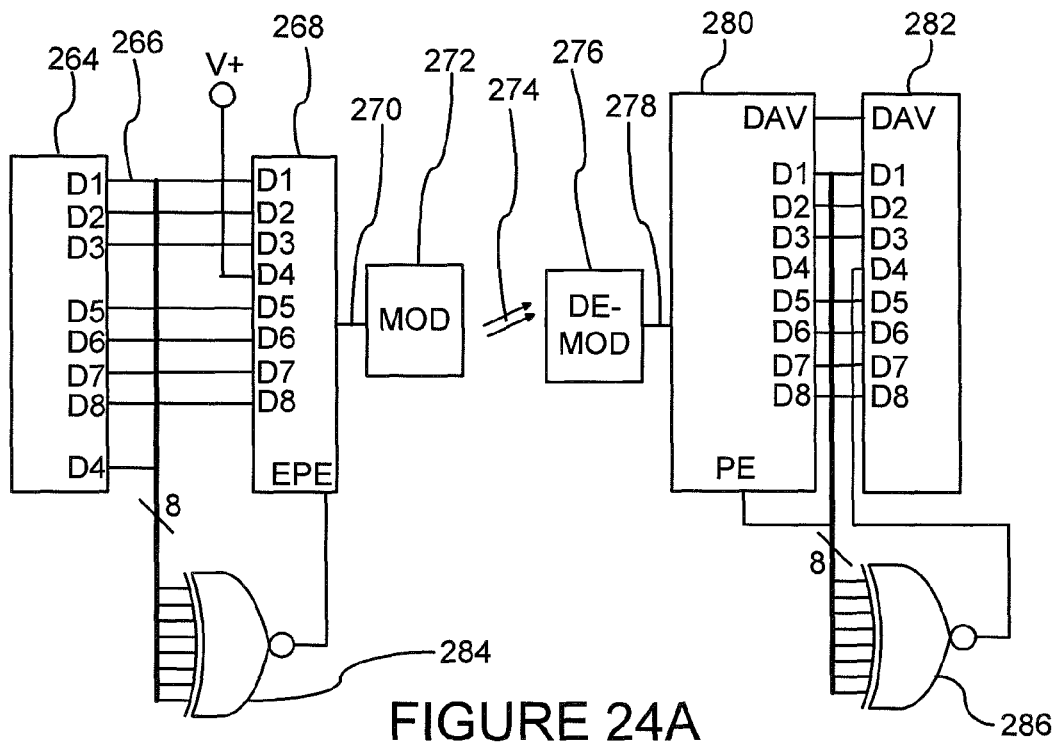
FIG. 24A is a more detailed schematic block diagram of an modulator arrangement for use in systems such as those of FIG. 10 or 18.

Using this improved modulator permits much longer integration times, consequently more robust optical segments, while remaining human imperceptible. The example of FIG. 24A shows a mechanism which permits a modulation which leaves a bit illuminated (here data bit 4 is a constant one) in the middle of the otherwise modulated word. This constricts the maximum fraction of the overall time for which the link will be continuously extinguished, hence permitting more data to be transferred without flicker, or the same data transferred more reliably without human perceived flicker.

In FIG. 24A the modulation arrangement of FIG. 2 is expanded to show in further detail processing means 264 with eight data outputs D1 through D8. All the outputs D1-D8, except output D4, are coupled in parallel data stream 266 to corresponding inputs D1-D8 of Universal Asynchronous Receiver Transmitter (UART) 268 which in turn presents a serially encoded and modulated signal 270 to optical transmitter 272 (corresponding to LED assembly in FIG. 2).

Optical transmitter 272 transmits optically encoded data 274 to optical receiver 276 which in turn outputs signal 278 to UART 280, which in turn presents the parallel data (D1 to D8) to processing means 282 (corresponding e.g., to processing means 82 of FIG. 10).

This arrangement is enhanced with the presence of two exclusive OR gates 284 and 286. The eight inputs of exclusive OR gate 284 are separately connected to the eight outputs D1-D8 of processor 264 to produce a high output when those outputs have even parity (an even number of bits are high). The output of Exclusive OR gate 284 is presented to Even Parity Enable input EPE of UART 268 to control whether UART 268 will supply an extra parity bit to produce even (odd) parity. In effect, the bit stream will be as shown in FIG. 24B where the fourth data position is always high and the value normally appearing there will be represented by the value of the bit 260 in the trailing parity position.

Figure 24B:
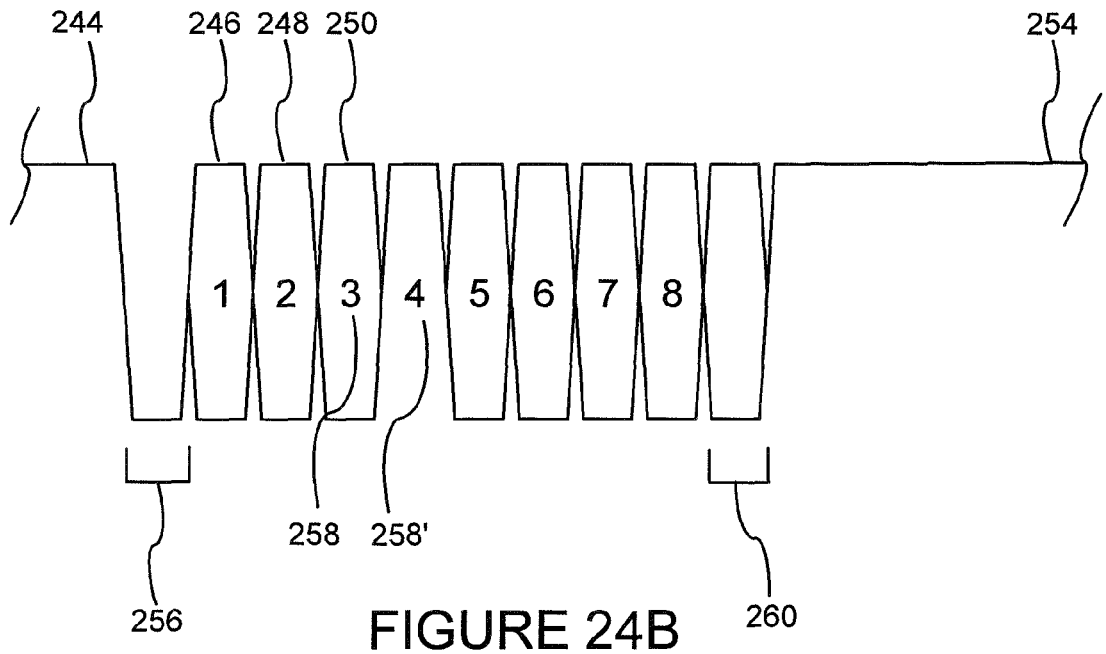
FIG. 24B shows an improved format word as transmitted by the circuit of FIG. 22A.

The use of the exclusive OR gate 284 permits data from bit 4, D4, to be interlaced with the rest of the data via the parity bit, (borrowed here) allowing the bit 4 input position to UART 268 to be tied to logic high allowing its position in the data stream, shown as 258' in FIG. 24B, to remain illuminated each time that it comes up.

The eight inputs of exclusive OR gate 286 separately connect to parity error output PE, outputs D1-D3, and outputs D5-D8 of UART 280. The outputs D1-D8 of UART 280 connect to the corresponding inputs D1-D8 of processor 282, except that the output of exclusive or gate 286 connect to input D4 of processor 282. Exclusive OR gate 286 by sampling the Parity Error Signal PE permits recovery of the parity bit and with sampling of the parity of the remaining data bits this can be presented to the signal processing means 282 prior to the Data Valid Signal DAV being asserted. UART 280 is configured to receive Even Parity. A complete set of data is thusly presented to data processing means 282 at inputs D1-D8.

Figure 25A:
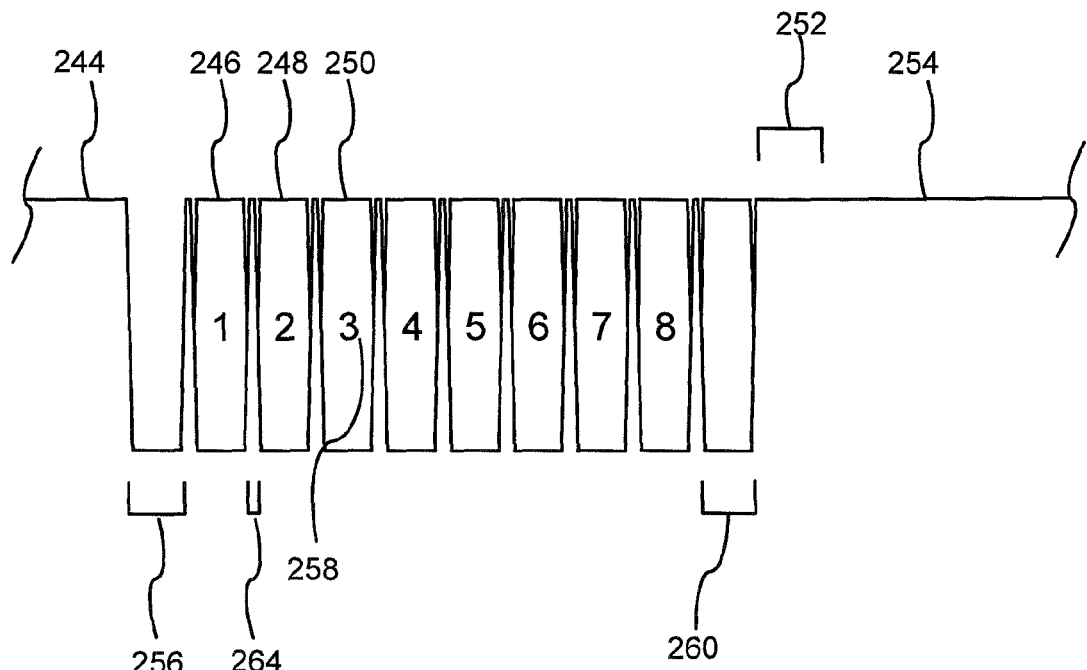
FIG. 25A shows a word format that is an alternate to that of FIG. 22B.

The arrangement shown in FIG. 25A involves enforcing an illuminated portion 264 of the data stream between the data bits so the extinguished portion is just less than the humanly discernable threshold. This signaling application, with potentially short contact intervals benefits from ensuring that the available time is used to a greater extent by the modulated signal wherein even with a maximum extinguished time flicker is not discernable to a human viewer. Start bit 256, parity bit 260, stop bit 252, initial signal level 244, bits 246, 248, 250 and so on as well as inter-word signal level 254 are other parts of the format. Bit numbers 258 are shown as Bits 1,2,3, and so on up to 8.

FIG. 25A shows the same standard word format wherein each bit time is interlaced with an on signal permitting a human to consider the transmitted word to be imperceptible from a solidly on transmission with repetitive on signals sufficiently wide and close permitting use with a receiver capable of increased signal resolution time.

Figure 25B:
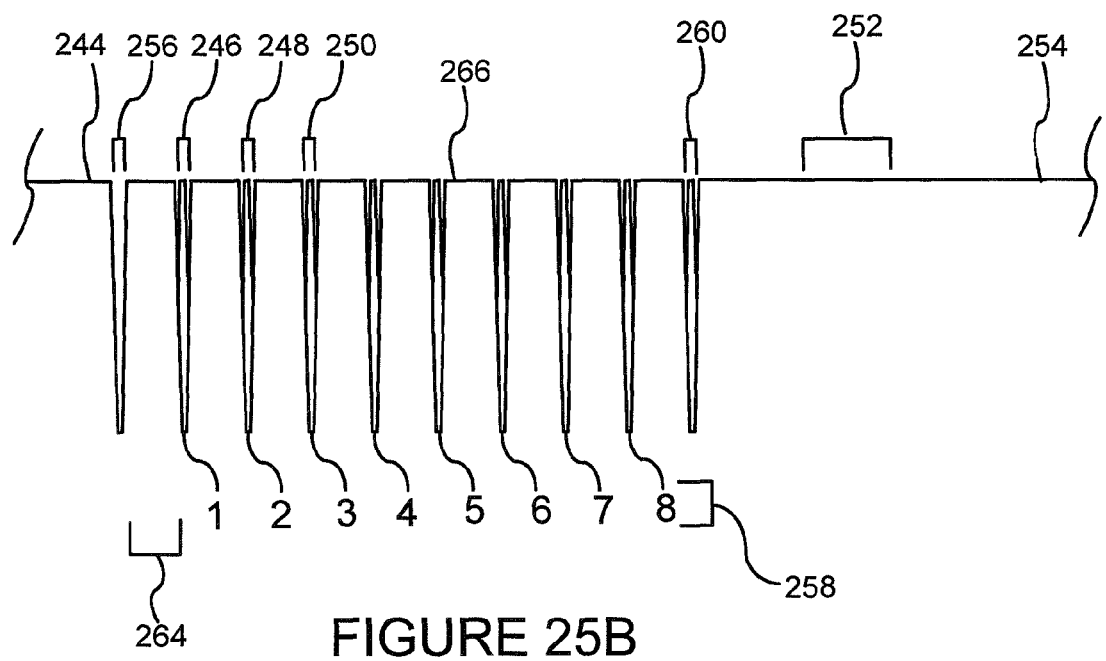
FIG. 25B shows a word format that is an alternate to those previously illustrated.

An alternate format is shown in FIG. 25B with relatively brief data bits and relatively long interbit intervals. Here the overall word should exceed the slowest flicker speed perceptible to humans. Start bit 256, parity bit 260, stop bit 252, initial signal level 244, bits 246, 248, 250 and so on as well as inter-word signal level 254 are the basic parts of the format. Bit numbers 258 are shown as Bits 1,2,3, and so on up to 8. Inter-bit signal levels are shown here as extinguished 266.

FIG. 25B is an alternative format indicating that for sufficiently robust optical links the data acquisition phase, shown here by 246, 248, 250 and so on, can be significantly less than the duration of the phase used to keep the human viewer perceiving these bit intervals as solidly on.

FIG. 25B shows the same standard word format wherein each bit time is interlaced with an on signal wherein the off time is reduced to that which is barely human imperceptible from a solid on signal.

Examples of this data format shown in FIGS. 25A and 25B are achievable by suitable processing in processor means 10 of FIG. 2. FIG. 25A is indicative of a format benefiting a link with illuminated elements shown in time interval 264, which is on sufficiently often that the data shown in data elements 246, 248, 250 and so on can be either high (illuminated) or low (extinguished) without concern.

Figure 26:
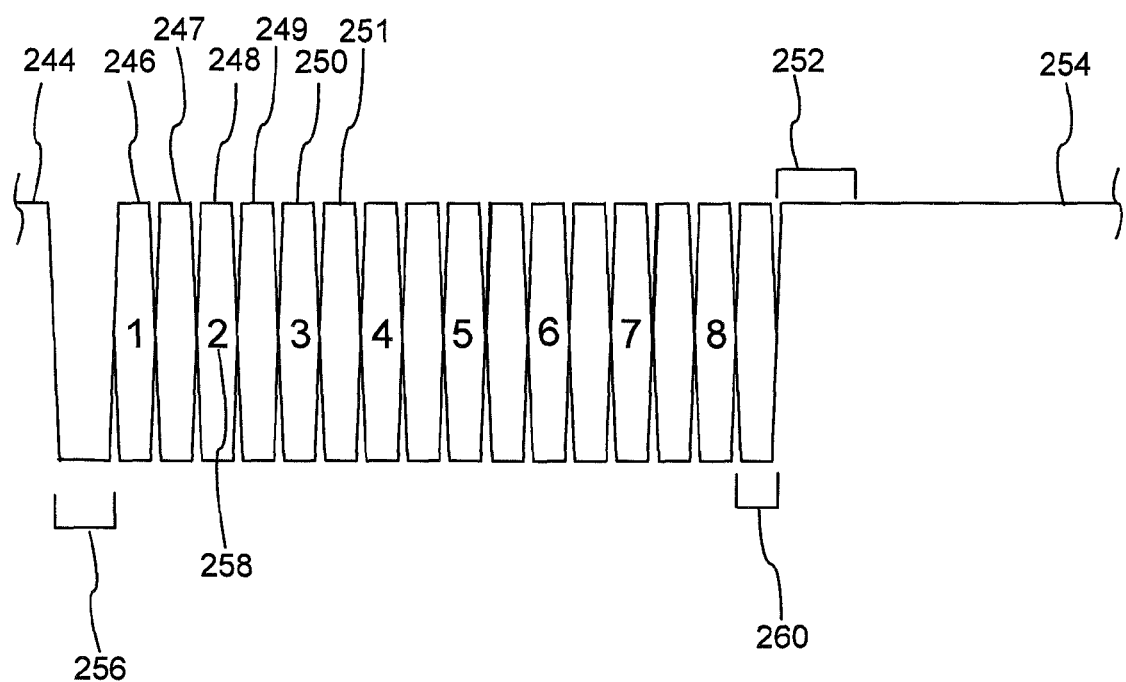
FIG. 26 shows a word format that is an alternate to those previously illustrated.

FIG. 26 shows the word format for an arrangement with ongoing sampling, offering interstice illumination based on the previous data passed. In this example the data processing means keeps a running track of how long the optical link has been extinguished for and ensures that a bit in this case shown in the interstices between the data being sent marked as 1,2,3, and so on, is illuminated frequently enough as to have the human viewer perceive the illumination source as continuously on. In one case a high data bit will be followed by a low interstitial bit and vice versa.

In general, the time that a vehicle is sufficiently optically aligned, between transmitter and receptor, should be used for data transfer, be it illuminated or extinguished, while retaining blanking intervals sufficiently short as to be imperceptible to humans. Thus, the data format should not modulate both data pulses and the inter-pulse blanking intervals concurrently, but rather one or the other.

Obviously, many modifications and variations of the present invention are possible in light of the above teachings. It is therefore to be understood that within the scope of the appended claims, the invention may be practiced otherwise than as specifically described.

The invention claimed is:

1. A communications arrangement for transmitting a message from a given vehicle for receipt by other vehicles, said given vehicle having an operator controllable assembly operable by a vehicle occupant for selectively energizing a plurality of electrical connectors that connect to operator controllable vehicle lights including one or more of turn signals, brake lights, headlights, running lights, and parking lights, said arrangement comprising:

a processor having a modulator and being coupled to the operator controllable assembly, said modulator being adapted to be connected to one or more of the plurality of connectors to affect the one or more of turn signals, brake lights, headlights, running lights, and parking lights, said modulator having an input adapted to receive an occupant-initiated control signal and produce in response an encoded main signal selectively modulated at or above a critical flashing frequency or with a pulse duration that is human imperceptible, said processor having a vehicle sensitive apparatus for producing a dynamic signal signifying traveling information associated with dynamic operation of said given vehicle, said processor being operable to store a plurality of values of said dynamic signal including publishable travel history comprising data about vehicle movement and associated time information, said main signal being modulated and encoded to indicate publishable travel history by periodically grouping together in the main signal updated data about vehicle movement and associated time information as stored by said processor for the given vehicle; and a receiver having a light sensing device with a predetermined two dimensional field of view for producing a detection signal having two dimensional information; and a utilization device coupled to said receiver for using the detection signal, said utilization device being operable to analyze vehicle lights of another vehicle that is oncoming relative to said given vehicle and is within said predetermined two dimensional field of view of said receiver in order to store information therefrom, analysis of vehicle lights of another vehicle being performed to distinguish information broadcast from all others that may be transmitting within said predetermined two dimensional field of view of said receiver and basing analysis on spatially regionalized visual elements occupying less than all of the predetermined two dimensional field of view defined in said two dimensional information, said utilization device being operable to send to said modulator for inclusion in said main signal unrequested stored information from one or more of the other ones of the vehicles.

2. A communications arrangement according to claim 1 wherein said light sensing device has a narrow spectral response that is narrower than the visible spectrum.

3. A communications arrangement according to claim 1 wherein said utilization device comprises:
   an analyzer for decoding said detection signal to produce a decoded signal.

4. A communications arrangement according to claim 3 wherein said utilization device comprises:
   an annunciator for producing a human-perceptible signal in response to said decoded signal.

5. A communications arrangement according to claim 4 wherein said annunciator comprises:
   a speech synthesizer for producing a verbal message in accordance with said decoded signal.

6. A communications arrangement according to claim 5 wherein said speech synthesizer is operable to produce a verbal message in a user selected language.

7. A communications arrangement according to claim 4 wherein said annunciator comprises:
   a character display for producing a legible message in accordance with said decoded signal.

8. A communications arrangement according to claim 4 wherein said receiver comprises a camera for producing the detection signal based on physical objects in a field of view of said camera, and wherein said main signal is encoded with bit time synchronization information, said camera being operable to adjust at least one of: camera field rate, camera frame rate, or camera line rate, said camera being synchronized by the detection signal produced by physical objects in the field of view of the camera.

9. A communications arrangement for transmitting a message from a vehicle having a plurality of electrical connectors located at an outside surface of a vehicle, some being differently keyed and adapted to connect to one or more of: head light, fog-light, position light, mirror lights, running lights, parking lights, tail lights, turn signals, and brake lights, said vehicle having an externally powered, but otherwise, stand-alone enhanced lighting assembly having a plurality of lights each comprising:
   a base having at least one contact adapted to attach to one of the electrical connectors;
   a processor electrically connected to and mechanically supported by said base, said processor having a modulator, said modulator being adapted to energize one or more of: head lights, fog-lights, position lights, mirror lights, running lights, parking lights, tail lights, turn signals, and brake lights, said modulator having an input adapted to receive a processor-initiated sequence and produce in response an encoded main signal modulated at or above a critical flashing frequency or with an interpulse blanking interval that is human imperceptible; and
   a light emitter mechanically supported by said base, said processor being electrically connected to said base and said light emitter, said base, said light emitter, and said processor forming a readily installable, self-contained assembly, said light emitter having a brightness rating allowing operation as one or more of head lights, fog-lights, position lights, minor lights, running lights, parking lights, tail lights, turn signals, and brake lights,
   each of said plurality of electrical connectors being connected, on a one-to-one basis, to one of a plurality of such readily installable, self-contained assemblies;
   each of said processors controlling the light emitter with which it is connected to send encoded modulation;
   said encoded modulation from said plurality of lights signifying at least one of: a braking message, a turning message, and an indication of vehicle identification, said encoded modulation being correlated to correspond with keying of said plurality of electrical connectors.

10. A system for exchanging messages among a plurality of vehicles, each of said vehicles having one or more externally detectable signalers, said system having in each vehicle a transceiver comprising:
   a processor having a vehicle sensitive apparatus for producing a dynamic signal signifying traveling information associated with dynamic operation of said vehicle, said processor being operable to store a plurality of values of said dynamic signal including publishable travel history comprising data about vehicle movement and associated time information, said processor including
   a modulator coupled to said vehicle sensitive apparatus and adapted to be coupled to the one or more signalers for sending thereto in response to said dynamic signal a main signal modulated and encoded to indicate publishable travel history by periodically grouping together in the main signal updated data about vehicle movement and associated time information as stored by said processor for the vehicle, said transceiver comprising:
   a receiver mounted in said vehicle and having a luminance sensing device with a predetermined two dimensional field of view for producing a detection signal having two dimensional information in response to receipt of the main signal with publishable travel history sent from the one or more externally detectable signalers of other ones of the vehicles; and
   a utilization device mounted in said vehicle and coupled to said receiver for using the detection signal and storing publishable travel history sent from the one or more externally detectable signalers of the other ones of the vehicles, including storing data about vehicle movement and associated time information about the other ones of the vehicles, said utilization device being operable to analyze vehicle lights of another vehicle that is oncoming relative to said given vehicle and is within said predetermined two dimensional field of view of said receiver in order to store information therefrom, analysis of vehicle lights of another vehicle being performed to distinguish information broadcast from all others that may be transmitting within said predetermined two dimensional field of view of said receiver and basing analysis on spatially regionalized visual elements occupying less than all of the predetermined two dimensional field of view defined in said two dimensional information, said utilization device being operable to send to said modulator for inclusion in said main signal unrequested stored information from one or more of the other ones of the vehicles.

11. A system according to claim 10 wherein said processor is coupled to said utilization device and is operable to compose the main signal with publishable travel history by grouping together in the main signal data about vehicle movement and associated time information stored in said utilization device about the other ones of the vehicles.

12. A method for exchanging messages among a plurality of vehicles, each of said vehicles having a transceiver, a luminance sensing device, and one or more externally detectable signalers, the method comprising the steps of:
producing a dynamic signal signifying traveling information associated with dynamic operation of a given one of said vehicles, said dynamic signal including publishable travel history comprising data about vehicle movement and associated time information;
sending to the one or more signalers in response to said dynamic signal a main signal modulated and encoded to indicate publishable travel history by periodically grouping together in the main signal updated data about vehicle movement and associated time information;
producing a detection signal from the luminance sensing device in response to receipt thereof of the main signal with publishable travel history sent from the one or more externally detectable signalers of an exclusively selected one of the vehicles that is within range of said luminance sensing device, said exclusively selected one being chosen from among currently transmitting ones of the plurality of vehicles within range of said luminance sensing device based on spatial proximity;
using the detection signal and storing publishable travel history sent from the one or more externally detectable signalers of the other ones of the vehicles, including storing data about vehicle movement and associated time information about the other ones of the vehicles; and
sending to the one or more signalers for inclusion in the main signal unrequested, stored publishable travel history from one or more of the other ones of the vehicles.

13. A method according to claim 12 comprising the step of: composing the main signal with previously stored, publishable travel history by grouping together in the main signal data about vehicle movement and associated time information about the other ones of the vehicles.

14. A method of transmitting an optically encoded message from a vehicle having an enhanced lighting assembly including one or more signalers having one or more, externally powered, stand-alone externally detectable lights functioning as one or more of head lights, fog-lights, position lights, minor lights, running lights, parking lights, tail lights, turn signals, and brake lights, said vehicle having a plurality of differently keyed electrical connectors located at an outside surface of a vehicle and adapted to connect to said one or more detectable lights, said externally detectable lights each having (a) a base with at least one contact adapted to attach to one of the electrical connectors, (b) a processor having a modulator and being electrically connected to and mechanically supported by said base, and (c) a light emitter mechanically supported by said base, said processor being electrically connected to said base and said light emitter, said base, said light emitter, and said processor forming a readily installable, self-contained assembly, said method comprising the steps of:
Installing and connecting the one or more stand-alone externally detectable lights that each form a readily installable, self-contained assembly, in one or more of the plurality of electrical connectors;
controlling each light emitter of the externally detectable lights to send encoded modulation by means of the processor associated therewith, said encoded modulation being internally produced within the one or more stand-alone externally detectable lights to signify at least one of: a braking message, a turning message, and an indication of vehicle identification, wherein said externally detectable lights function as at least one of: headlamp, fog-lamp, parking lights, tail light, turn light, and brake light,
said modulation being internally generated through a processor-initiated sequence in order to produce an encoded main signal modulated at or above a critical flashing frequency or with an inter-pulse blanking interval that is human imperceptible,
said one or more externally detectable lights when modulated having a brightness allowing operation as one or more of: head lights, fog-lights, position lights, mirror lights, running lights, parking lights, tail lights, turn signals, and brake lights, said encoded modulation differing among different installed ones of said plurality of different lights and being correlated to correspond with keying of said plurality of electrical connectors.

15. The method of claim 14 wherein the signalers comprise a modulator assembly which is configured to appear as a conventional lighting assembly format, at the bulb level of assembly.

16. The method of claim 15 wherein the modulation assembly is powered by conventional vehicle wiring.

17. A communications arrangement as in claim 9 wherein some of said plurality of connectors are mechanically keyed, said base being mechanically keyed to be installed in only those ones of said connectors that are keyed to mate with said base.

18. A communications arrangement as in claim 9 wherein some of said plurality of connectors are electronically keyed to signify a specific manner of operation, said base being operable to read keying of an occupied one of said plurality of connectors in order to determine the specific manner of operation and produce in response encoded modulation corresponding to keying of said occupied one of said plurality of connectors.

19. A communications arrangement as in claim 9 wherein some of said plurality of connectors are electronically keyed to signify a specific manner of operation, said base being operable to read keying of an occupied one of said plurality of connectors in order to determine the specific manner of operation and produce in response encoded modulation corresponding to keying of said occupied one of said plurality of connectors, said connectors being keyed electronically to one of: headlight, tail-light, inside tail light, outside tail light, brake light, turn signal, mirror light, position light, navigation light, landing light, taxi light, license plate light, door light, fog light, strobe light, right light, left light, front light, rear light, center light, right-inside light, left-inside tail light right brake light, left brake light, center brake light, left headlight, left turn signal, right turn signal, left mirror light, right mirror light, vehicle ID, lighting assembly serial number, and at least part of a network location.

20. A communications arrangement according to claim 9 wherein one or more of said connectors have keying corresponding to a vehicle identification or lighting assembly serial number.

21. A communications arrangement according to claim 9 wherein said main signal is modulated to indicate at least one of vehicle identity and a network address.

* * * * *